(12) United States Patent
Shinotsuka

(10) Patent No.: US 6,353,765 B1
(45) Date of Patent: Mar. 5, 2002

(54) ELECTRONIC APPARATUS POWER SUPPLY CONTROL METHOD AND RECORDING MEDIUM

(75) Inventor: Hideaki Shinotsuka, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/162,331

(22) Filed: Sep. 28, 1998

(30) Foreign Application Priority Data

Sep. 30, 1997 (JP) .............................................. 9-267475

(51) Int. Cl.[7] .......................... G05B 13/02; G06F 1/26; G06F 15/16
(52) U.S. Cl. ................................ 700/8; 700/2; 700/22; 700/295; 709/200; 709/322; 713/320; 713/324
(58) Field of Search ................................ 700/1, 2, 3, 8, 700/9, 11, 22, 28, 295; 709/321, 322, 323, 200, 225; 710/4, 7, 9; 713/320, 324

(56) References Cited

U.S. PATENT DOCUMENTS

| 5,255,180 | A | * | 10/1993 | Shinoda et al. | ................ 700/11 |
|---|---|---|---|---|---|
| 5,305,355 | A | * | 4/1994 | Go et al. | ..................... 375/356 |
| 5,550,979 | A | * | 8/1996 | Tanaka et al. | ............... 709/209 |
| 5,796,352 | A | * | 8/1998 | Tanaka et al. | .......... 340/825.24 |
| 5,796,607 | A | * | 8/1998 | La Van Suu | .................. 700/11 |
| 5,835,780 | A | * | 11/1998 | Osaki et al. | ................. 713/300 |
| 5,884,087 | A | * | 3/1999 | White et al. | ................. 713/310 |
| 6,038,625 | A | * | 3/2000 | Ogino et al. | ................. 710/104 |
| 6,052,750 | A | * | 4/2000 | Lea | .............................. 710/72 |
| 6,170,013 | B1 | * | 1/2001 | Murata | ........................ 709/229 |
| 6,233,611 | B1 | * | 5/2001 | Ludtke et al. | ............... 709/223 |

* cited by examiner

*Primary Examiner*—William Grant
*Assistant Examiner*—Paul Rodriguez
(74) *Attorney, Agent, or Firm*—Frommer Lawrence & Haug LLP; William S. Frommer

(57) ABSTRACT

An electronic apparatus controls a single or a plurality of objects. The electronic apparatus, which serves as a node, has an attribute information database that stores attribute information of object service modules. A service registry switches off a power supply after transmitting the attribute information stored in the attribute information database to the service registry of another electronic apparatus and delegating it to respond to queries concerning the attribute information provided from an external source. This enables the electronic apparatus to reduce power consumption while maintaining a searching capability.

10 Claims, 27 Drawing Sheets

FIG. 4

| NODE ID | ATTRIBUTE INFORMATION DATABASE ID | NUMBER OF BYTES OF ATTRIBUTE INFORMATION |
|---------|-----------------------------------|------------------------------------------|
| BB      | DATABASE B                        | SIZE B                                   |
| :       | :                                 | :                                        |

FIG. 5

| SENDER ID | DELEGATION REQUEST ID | DELEGATION REQUEST CONTENT | |
|-----------|----------------------|----------------------------|---------|
|           |                      | ATTRIBUTE INFORMATION SIZE | NODE ID |
| XXXXXXX   | 2345                 | SIZE B                     | BB      |

FIG. 7

| SEARCH ID | NUMBER OF NODES | NODE ID | NUMBER OF CORRESPONDING MODULES | CORRESPONDING MODULE ID | ... | CORRESPONDING MODULE ID |
|---|---|---|---|---|---|---|
| 1234 | 2 | BB | n | B1 | ... | Bn |
| | | CC | m | C1 | ... | Cm |

| MODULE ID | ATTRIBUTE NAME | ATTRIBUTE |
|---|---|---|
| 1 | "MODULE TYPE" | "BROADCAST MANAGER" |
| 2 | "MODULE TYPE" | "EVENT MANAGER" |
| 4 | "MODULE TYPE" | "NETWORK MANAGER" |
| 11 | "MODULE TYPE" | "DISPLAY" |

FIG. 18

| MODULE ID | MODULE TYPE | MODULE NAME | NUMBER OF ATTRIBUTES | ATTRIBUTE NAME 1 | ATTRIBUTE 1 |
|---|---|---|---|---|---|
| 1 | 1 | "BROADCAST MANAGER" | 0 | | |
| 2 | 2 | "EVENT MANAGER" | 0 | | |
| 4 | 3 | "NETWORK MESSENGER" | 0 | | |
| 11 | 100 | "D-001" | 1 | "SIZE" | "21" |

FIG. 19

| MODULE ID | MODULE TYPE | MODULE NAME | NUMBER OF ATTRIBUTES | ATTRIBUTE TYPE | ATTRIBUTE NAME | ATTRIBUTE |
|---|---|---|---|---|---|---|
| 1 | 1 | "BROADCAST MANAGER" | 0 | | | |
| 2 | 2 | "EVENT MANAGER" | 0 | | | |
| 4 | 3 | "NETWORK MESSENGER" | 0 | | | |
| 11 | 100 | "D-001" | 3 | 101 | | "21" |
| | | | | 102 | | "COLOR" |
| | | | | 0 | "SOUND" | "STEREO" |

FIG. 20

| SEARCH ATTRIBUTE NAME | SEARCH ATTRIBUTE |
|---|---|
| "MODULE TYPE" | "DISPLAY" |

FIG. 21

| SEARCH ATTRIBUTE TYPE | SEARCH ATTRIBUTE NAME | SEARCH ATTRIBUTE |
|---|---|---|
| 101 |  | "21" |

FIG. 22

| NUMBER OF CORESSPONDING MODULES | CORRESPONDING MODULE ID 1 |
|---|---|
| 1 | 11 |

FIG. 23

| SENDER ID | SEARCH ID | SEARCH CONTENT | | |
|---|---|---|---|---|
| | | SEARCH ATTRIBUTE ID | SEARCH ATTRIBUTE NAME | SEARCH ATTRIBUTE |
| XXXXXXXX | 1234 | 101 | | "21" |

FIG. 24

| SEARCH ID | SEARCH RESULT LIST ID | LIST UNNECESSARY? |
|---|---|---|
| ⋮ | ⋮ | ⋮ |
| 1234 | 201 | 0(FALSE) |

FIG. 25

| SEARCH ID | NODE ID | NUMBER OF CORRE-SPONDING MODULES | CORRESPONDING MODULE ID 1 | ..... | CORRESPONDING MODULE ID n |
|---|---|---|---|---|---|
| 1234 | BB | n | B1 | ..... | Bn |

FIG. 26

| NUMBER OF CORRE-SPONDING MODULES | CORRESPONDING MODULE ID 1 | CORRESPONDING MODULE ID 2 | ..... | CORRESPONDING MODULE ID n+1 |
|---|---|---|---|---|
| n + 1 | 11 | B1' | ..... | Bn' |

FIG. 27

| MODULE ID AT NODE AA | NODE ID | MODULE ID AT NODE TO WHICH CORRESPONDING SERVICE MODULE BELONGS |
|---|---|---|
| 11 | 0 | 11 |
| B1' | BB | B1 |
| ⋮ | ⋮ | ⋮ |
| Bn' | BB | Bn |

FIG. 28

| MODULE ID AT NODE AA | NODE ID TO WHICH CORRESPONDING SERVICE MODULE BELONGS | MODULE ID AT NODE TO WHICH CORRESPONDING SERVICE MODULE BELONGS |
|---|---|---|
| B1' (=10001) | BB | B1 |
| ⋮ | ⋮ | ⋮ |
| Bn' (=10000+n) | BB | Bn |

FIG. 29

| EVENT TYPE | PARAMETER | |
|---|---|---|
| | SEARCH RESULT ID | |
| SEARCH RESULT UPDATE | 201 | |

FIG. 30

| MESSAGE TYPE | PARAMETER | |
|---|---|---|
| | SEARCH RESULT ID | |
| UPDATE RESULT | 201 | |

FIG. 34A

| MESSAGE TYPE | PARAMETER LENGTH | PARAMETER | |
|---|---|---|---|
| 32 bits | 16 bits | 32 bits | 32 bits |
| OBSERVER TYPE | 8 | EVENT NO. | OBSERVER |

FIG. 34B

| MESSAGE TYPE | PARAMETER LENGTH | PARAMETER | |
|---|---|---|---|
| 32 bits | 16 bits | 32 bits | 32 bits |
| CANCELING TYPE | 8 | EVENT NO. | OBSERVER |

FIG. 34C

| MESSAGE TYPE | PARAMETER LENGTH | PARAMETER | | |
|---|---|---|---|---|
| 32 bits | 16 bits | 32 bits | 16 bits | VARIABLE LENGTH |
| INFORMATION TYPE | VARIABLE LENGTH | EVENT NO. | PARAMETER LENGTH | PARAMETER |

ELECTRONIC APPARATUS POWER SUPPLY CONTROL METHOD AND RECORDING MEDIUM

BACKGROUND OF THE INVENTION

1. Field of the Invention

The present invention relates to an electronic apparatus that stores attribute information of an object to be controlled and responds to queries concerning the attribute information. The invention is also concerned with a power supply control method for controlling the power supply of an object and to a recording medium in which a sequence of processing steps of responding to queries concerning the attribute information of an object is recorded. Details of certain features of the present invention are described in European Patent Application No. 0,753,811 A1 entitled in "Data processing method and device" and filed by the same assignee on Jul. 12, 1996 claiming a Convention Priority on JP 178625/95, filed Jul. 14, 1997, the complete disclosure of which is hereby incorporated herein by reference.

2. Description of the Related Art

The following type of network is known in which audio-visual (AV) machines, such as television receivers, video cassette recorders, and tuners, are connected and information signals, such as audio signals, video signals, and control signals, are transmitted through the network. This type of network includes a distributed cooperative network in which AV machines connected to the network are distributed and independently operated, and are also operated in cooperation with each other in response to an information signal transmitted via the network.

In the distributed cooperative network, an electronic apparatus, which serves as a node, has a service registry that manages attribute information of a service module formed of an object to be controlled. Accordingly, it is possible for each apparatus to access a service module of another electronic apparatus via this network, thereby effecting a distributed cooperative operation.

In a household AV network, it is highly likely that the connection state of AV machines is changed, it is preferable that the service registry of one node does not store information concerning the service module of another node.

The above AV network includes not only television receivers, whose connection state is normally fixed, but also portable compact disc (CD) players and video cameras, whose connection states may be changed. It is wasteful and unnecessary to store information concerning the machines, which may be disconnected at any time, in a specific server when they are connected to a network.

A proxy server, which integrally controls other servers, may be used for storing information concerning the AV machines when they are connected to the network. It is very likely, however, that even the proxy server be disconnected since the household AV machines may be frequently connected to and disconnected from the network. It is thus necessary to cope with the disconnection of the AV machines. Further, information concerning the AV machines stored in a proxy server is not always guaranteed because the connection state may be changed by the time a search has been conducted. It is therefore necessary to check the data when necessary.

On the other hand, in the distributed cooperative network in which service registries of the respective nodes are operated in cooperation with each other, it is necessary for the central processing units (CPUs) and the service modules of the respective nodes to be constantly operated to monitor and process a search request packet flowing in the network. Accordingly, a large amount of power is consumed.

In a system in which the service registries of the respective nodes in a network are operated cooperatively, a message to be delivered without specifying a destination, which is referred to as a "broadcast message", is transmitted even if all the service modules within a node are not used. By using this broadcast message, the service registry executes processing on a search request and transmit a search result. In order to handle the broadcast message, the CPU should always be operated, thereby wasting power even when the service modules are not in use.

SUMMARY OF THE INVENTION

Accordingly, in view of the above background, it is an object of the present invention to provide an electronic apparatus that eliminates the need for the CPU of the service registry of each node to be constantly operated for responding to a broadcast message, and also to provide a method for controlling the power supply of the above type of electronic apparatus and a recording medium in which a program implementing the above power supply control method is recorded.

In order to achieve the above object, according to one aspect of the present invention, there is provided an electronic apparatus for controlling at least one object. The apparatus includes attribute information storage means for storing attribute information of at least one object. Attribute information management means manages the attribute information storage means and switches off a power supply after transmitting the attribute information stored in the attribute information storage means to attribute information management means provided for an external electronic apparatus and delegating the external electronic apparatus to respond to queries provided from an external source concerning the attribute information stored in the attribute information storage means.

According to another aspect of the present invention, there is provided an electronic apparatus for controlling at least one object. The apparatus includes attribute information storage means for storing attribute information of at least one object and for storing, upon being delegated by a first external electronic apparatus, attribute information of at least one object of the first external electronic apparatus. Attribute information management means manages the attribute information storage means and responds to queries provided from an external source concerning the attribute information of at least one object of the electronic apparatus stored in the attribute information storage means and to queries provided from the external source concerning the attribute information of at least one object of the first external electronic apparatus.

According to still another aspect of the present invention, there is provided a power supply control method for controlling a power supply of at least one object. The method includes an attribute information acquiring step of acquiring attribute information of at least one object, and an attribute information management step of managing the attribute information acquired in the attribute information acquiring step and switching off the power supply after transmitting the attribute information to an external electronic apparatus and delegating the external electronic apparatus to respond to queries concerning the attribute information provided from an external source.

According to a further aspect of the present invention, there is provided a power supply control method for controlling a power supply of at least one object. The method includes an attribute information acquiring step of acquiring attribute information of at least one object and acquiring, upon being delegated by a first external electronic apparatus, attribute information of at least one object of the first external electronic apparatus, and an attribute information management step of responding to queries concerning the attribute information of at least one object of the electronic apparatus acquired in the attribute information acquiring step and to queries provided from an external source concerning the attribute information of the first external electronic apparatus.

According to a yet further aspect of the present invention, there is provided a recording medium in which a program implementing the following process is recorded. The process includes an attribute information acquiring step of acquiring attribute information of at least one object, and an attribute information management step of switching off a power supply after transmitting the attribute information acquired in the attribute information acquiring step to an external electronic apparatus and delegating the external electronic apparatus to respond to queries concerning the attribute information provided from an external source.

According to a further aspect of the present invention, there is provided a recording medium in which a program implementing the following process is recorded. The process includes an attribute information acquiring step of acquiring attribute information of at least one object and acquiring, upon being delegated by an external electronic apparatus, attribute information of at least one object of the external electronic apparatus, and an attribute information management step of responding to queries concerning the attribute information of at least one object of the electronic apparatus acquired in the attribute information acquiring step and to queries concerning the attribute information of the external electronic apparatus provided from an external source.

BRIEF DESCRIPTION OF THE DRAWINGS

FIG. 4 illustrates a database concerning attribute information of an apparatus that has transmitted search delegation;

FIG. 5 illustrates a search delegation request message to be broadcast by a service registry;

FIG. 7 illustrates a search result including a plurality of nodes obtained in response to a broadcast search request;

FIG. 18 illustrates a second example of a service module database possessed by a service registry;

FIG. 19 illustrates a third example of a service module database possessed by a service registry;

FIG. 20 illustrates a first example of a search request message from a service module to a service registry;

FIG. 21 illustrates a second example of a search request message from a service module to a service registry;

FIG. 22 illustrates an example of a search result message created by a service registry;

FIG. 23 illustrates an example of a search request message to be broadcast by a service registry;

FIG. 24 illustrates an example of a database possessed by a service registry representing a correlation between the search ID and the search result list ID;

FIG. 25 illustrates an example of a search result message in response to a broadcast search request;

FIG. 26 illustrates an example of a search result message created by a service registry;

FIG. 27 illustrates an example of a module ID to which a node ID is added;

FIG. 28 illustrates a database concerning an internal module ID, an external module ID, and a node ID;

FIG. 29 illustrates an event information message;

FIG. 30 illustrates an update result message;

FIG. 34, which is comprised of FIGS. 34A, 34B and 34C, illustrates a message concerning the registration and the cancellation of an observer in a service list and the generation of an event;

DESCRIPTION OF THE PREFERRED EMBODIMENT

An electronic apparatus, a power supply method, and a recording medium according to the present invention are now described with reference to the drawings.

Figure 1:
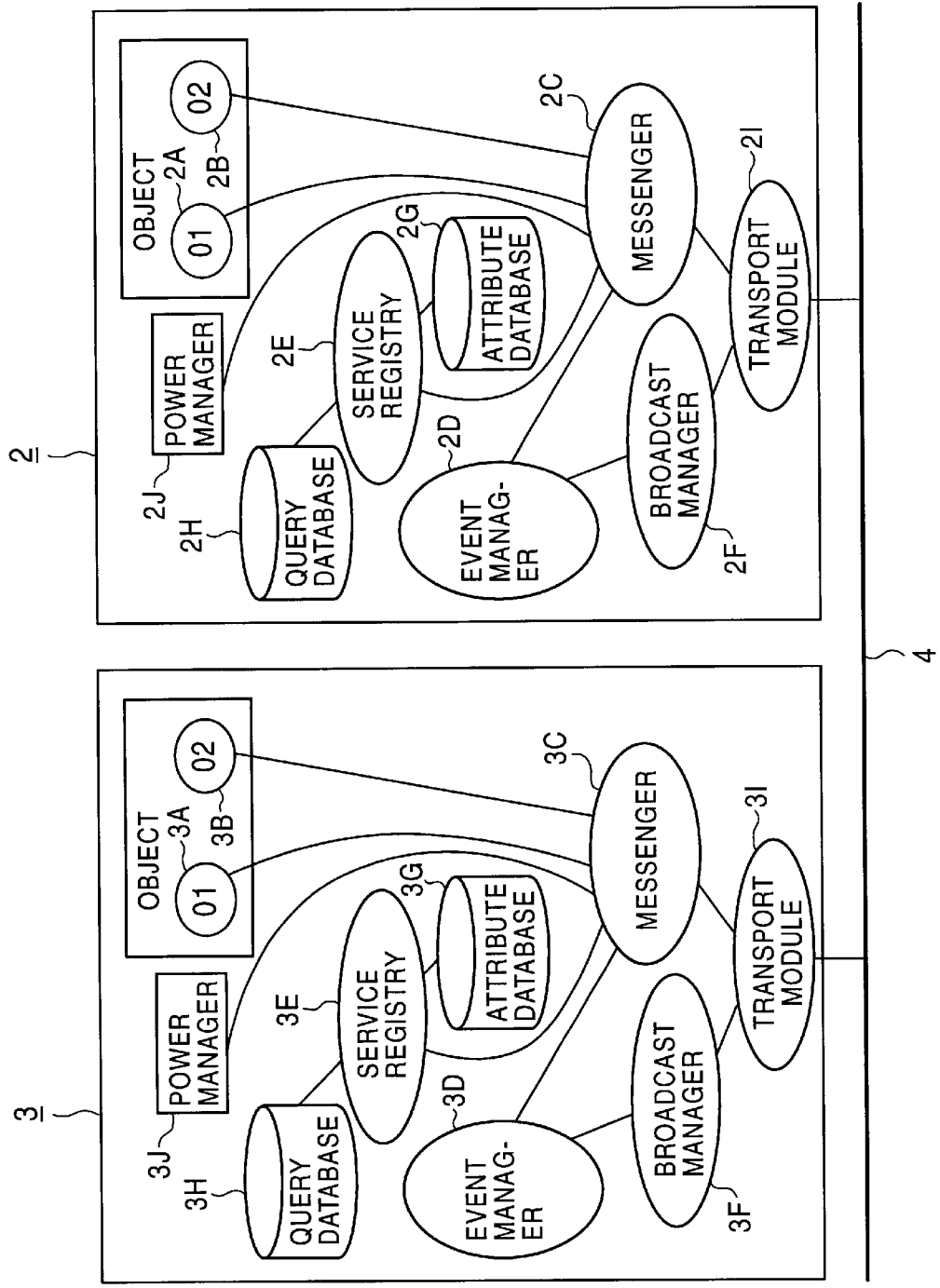
FIG. 1 is a block diagram illustrating the schematic configuration of electronic apparatuses connected to a network.

Referring to the block diagram shown in FIG. 1, an AV communication system is shown in which electronic apparatuses, such as a television receiver 2 and a video cassette recorder 3, both of which serve as nodes, are connected via a network 4.

The television receiver 2 and the video cassette recorder 3 have common configuration, except for objects to be controlled. The control processes are also differentiated in the apparatuses 2 and 3 since the objects to be controlled are different. Accordingly, in the following description, the same elements are designated with like letters, and thus, an explanation thereof is given only once.

The television receiver 2 receives a desired channel in a tuner (not shown) and outputs a video signal and an audio signal. The television receiver 2 also displays the video signal output from the tuner on a monitor (not shown) or displays the video signal reproduced by the video cassette recorder 3.

In the television receiver 2, an object 2A and an object 2B are formed by control modules for controlling the tuner and the monitor, respectively, and a unique ID is assigned to each object 2A or 2B in the television receiver 2.

The video cassette recorder 3 receives a desired channel in a tuner (not shown) and outputs a video signal and an audio signal. Further, the video cassette recorder 3 records in a magnetic recording/reproducing unit (not shown) the video signal and the audio signal received by the tuner or by the television receiver 2 and also reproduces the recorded video signal and audio signal.

In the video cassette recorder 3, an object 3A and an object 3B are formed by control service modules for controlling the tuner and the magnetic recording/reproducing unit, respectively. A unique ID is assigned to each object 3A or 3B in the video cassette recorder 3.

Upon generating various events to be reported to unspecified destinations, the objects 2A through 3B report the events to the other service modules within the apparatuses 2 and 3 via event managers 2D and 3D, respectively. If necessary, the objects 2A through 3B respectively notify the events to external apparatuses sequentially through the event managers 2D and 3D, broadcast managers 2F and 3F, and the network 4.

The term "event" used in this specification means a change in the state of each of the objects 2A through 3B. For example, when a user operates the operating unit of the video cassette recorder 3 to change the receiving channel of the tuner, a magnetic cassette may be loaded or discharged or reproduction may be discontinued. Such an operation corresponds to an event.

A connection of each apparatus 2 or 3 to the network 4 is also the generation of an event. A connection of the television receiver 2 or the video cassette recorder 3 to the network 4 is physically detected by an object to be controlled (not shown) and, based on the detection result, the object reports the event information.

The objects 2A through 3B notify via the event managers 2D and 3D the generation of the event to the individual service modules within the apparatuses 2 and 3 through a message that is transmitted and received among the service modules within the apparatuses 2 and 3, respectively. In reporting the event, the event managers 2D and 3D respectively request the broadcast managers 2F and 3F to broadcast a message.

The objects 2A through 3B further respectively obtain messages transmitted and addressed to themselves from the other objects within the apparatuses 2 and 3 and messages transmitted to the network 4 from other apparatuses. This makes it possible to control the other objects and the operation of an object in response to a change in the state of an external apparatus.

In exchanging messages, the objects 2A through 3B respectively deliver messages to the event managers 2D and 3D and service registries 2E and 3E, which serve as attribute information management means, via messengers 2C and 3C, respectively. Accordingly, the messages can be delivered to the registered destinations within the apparatuses 2 and 3 and to unspecified destinations outside the apparatuses 2 and 3.

Conversely, the objects 2A through 3B receive via the messengers 2C and 3C messages transmitted via the event managers 2D and 3D and the service registries 2E and 3E, respectively, thereby obtaining messages sent to the network 4 from external apparatuses.

In delivering messages, the event managers 2D and 3D respectively execute processing by using their own functions when messages are transmitted to the registered destinations within the apparatuses 2 and 3, while the event managers 2D and 3D respectively execute processing by using the broadcast managers 2F and 3F when messages are transmitted to the unspecified destinations outside the apparatuses 2 and 3. Broadcast messages received via the network 4 are delivered to the registered destinations by the event managers 2D and 3D based on one-to-one communications.

In this manner, the objects 2A through 3B send various messages within and without the apparatuses 2 and 3 based on one-to-one communications with the event managers 2D and 3D and the service registries 2E and 3E, respectively. Regardless of being within or without the apparatus 2 or 3, the messenger 2C or 3C executes processing in delivering messages addressed to a single destination. The messenger 2C or 3C also executes processing in delivering messages addressed to a specific destination without the apparatus 2 or 3.

The television receiver 2 and the video cassette recorder 3 have the service registries 2E and 3E, attribute databases 2G and 3G, which serve as attribute information storage means, and query databases 2H and 3H, respectively.

The attribute databases 2G and 3G store attribute information concerning the objects 2A through 3B of the apparatuses 2 and 3, respectively, and the attribute information is read from and written into the attribute databases 2G and 3G under the control of the service registries 2E and 3E, respectively.

The query databases 2H and 3H store information concerning queries, such as a search request, and the information is read from and written into the query databases 2H and 3H under the control of the service registries 2E and 3E, respectively.

The service registries 2E and 3E, which register and manage the attribute information concerning the objects 2A through 3B of the apparatuses 2 and 3, respectively, respond to queries provided from within or without the television receiver 2 and the video cassette recorder 3 via the messengers 2C and 3C by referring to the attribute databases 2G and 3G and the query databases 2H and 3H, respectively.

The television receiver 2 and the video cassette recorder 3 are provided with power managers 2J and 3J, respectively, which serve as service modules used for monitoring whether the objects 2A through 3B are being used and inhibiting unnecessary power consumption. The states of the objects 2A through 3B are made known to the power managers 2J and 3J by receiving an event via the messengers 2C and 3C, thereby controlling the on/off state of a power supply if necessary.

An example of a method for controlling the power supply within the television receiver 2 or the video cassette recorder 3 is as follows.

The service registry 2E or 3E of the television receiver 2 or the video cassette recorder 3 stores attribute information of a service module, which forms an object to be controlled, in the attribute database 2G or 3G and responds to queries provided from within and without the apparatus 2 or 3. For example, in response to a search request, the service registry 2E or 3E checks the presence of service modules matching search conditions and responds to the query.

In switching off the power supply of the television receiver 2 or the video cassette recorder 3, the following procedure is employed. The service registry 2E or 3E supplies the attribute information of the service modules stored in the attribute database 2G or 3G to the service registry of another electronic apparatus and delegates it to respond to a query concerning the attribute information. The power manager 2J or 3J then switches off the power supply. Alternatively, the CPU for controlling the apparatus 2 or 3 may be deactivated rather than switching off the power supply.

For example, in switching off the power supply of the television receiver 2, the service registry 2E transmits the attribute information of the service modules of the television receiver 2 stored in the attribute database 2G to the service registry 3E of the video cassette recorder 3.

More specifically, the attribute information stored in the attribute database 2G of the television receiver 2 is transmitted to the network 4 via the messenger 2C and a transport module 2I. The attribute information then reaches the service registry 3E via a transport module 3I and the messenger 3C of the video cassette recorder 3.

After the television receiver 2 delegates the service registry 3E of the video cassette recorder 3 to answer a query concerning the transmitted attribute information, the power manager 2J is caused to switch off the power supply of the television receiver 2. Alternatively, instead of turning off the power supply, the CPU for controlling the overall television receiver 2 may be deactivated.

Accordingly, in place of the service registry 2E of the television receiver 2, the service registry 3E of the video cassette recorder 3 responds to any query concerning the attribute information of the service modules provided for the television receiver 2. If the query is concerned with a service module of the television receiver 2, for example, with the monitor of the television receiver 2, the service registry 3E switches on the power supply or activates the deactivated CPU within the television receiver 2.

In this fashion, before switching off the power supply or deactivating the CPU, the service registry 2E or 3E of the television receiver 2 or the video cassette recorder 3 delegates another electronic apparatus to respond to queries concerning the attribute information of the service modules.

Accordingly, even if the power supply is switched off or the CPU is deactivated within the television receiver 2 or the video cassette recorder 3, another electronic apparatus is delegated to answer queries concerning the attribute information. As a consequence, a reduction in the power consumption is achieved while maintaining a distributed cooperative operation in which queries can be responded to.

Another example of a method for controlling the power supply within the television receiver 2 or the video cassette recorder 3 is now described.

The service registry 2E or 3E of the television receiver 2 or the video cassette recorder 3 stores attribute information of the service modules and responds to a query, such as a search request, provided from within and without the electronic apparatus 2 or 3.

More specifically, when the service registry 2E or 3E is delegated to respond to queries by another electronic apparatus, it stores in the attribute database 2G or 3G not only the attribute information of the service modules of the television receiver 2 or the video cassette recorder 3, but also attribute information of the service modules of the apparatus which has requested the above delegation. Accordingly, the service registry 2E or 3E responds to queries concerning not only the attribute information of the service modules of its own apparatus, but also the attribute information of the service modules of the apparatus which has requested the above delegation.

Namely, when the television receiver 2 or the video cassette recorder 3 is delegated to respond to queries by the service registry of another electronic apparatus and receives attribute information from the attribute database of the above-mentioned apparatus, the attribute information is stored in the attribute database 2G or 3G. The service registry 2E or 3E then answers any query concerning the attribute information by referring to the attribute database 2G or 3G.

If the power supply is switched off or the CPU is deactivated within the electronic apparatus which has requested the above delegation, the television receiver 2 or the video cassette recorder 3 responds to queries concerning the attribute information of the above electronic apparatus. If the query is concerned with the attribute information of the above electronic apparatus, the television receiver 2 or the video cassette recorder 3 switches on the power supply or activates the deactivated CPU within the apparatus.

For example, if the service registry 2E of the television receiver 2 receives the attribute information of the service modules provided with the video cassette recorder 3 stored in the attribute database 3G from the service registry 3E and is delegated to respond to the attribute information of the video cassette recorder 3, the attribute information is stored in the attribute database 2G. The service registry 2E then responds to any query concerning the attribute information of the service modules of the video cassette recorder 3 as well as the attribute information of the service modules of the television receiver 2 by referring to the attribute database 2G.

If the query is concerned with the attribute information of the video cassette recorder 3, for example, if the magnetic recording/reproducing unit of the video cassette recorder 3 is being searched, the power supply is switched on or the deactivated CPU is activated within the video cassette recorder 3.

As discussed above, upon being delegated to respond to queries concerning the attribute information by the service registry of another electronic apparatus, the television receiver 2 or the video cassette recorder 3 stores the transmitted attribute information in the attribute database 2G or 3G. Then, the television receiver 2 or the video cassette recorder 3 answers any query concerning the attribute information for the above electronic apparatus.

In this manner, the power supply is switched off or the CPU is deactivated within the above electronic apparatus after the apparatus has delegated the television receiver 2 or the video cassette recorder 3 to respond to queries concerning the attribute information of the above apparatus.

Accordingly, even if the power supply is switched off or the CPU is deactivated within the electronic apparatus, queries concerning the attribute information of the apparatus can be responded to via the network 4.

As a consequence, in the above electronic apparatus, a reduction in the power consumption is achieved while maintaining a distributed cooperative operation in which queries from an external source can be responded to. When a request is provided to search the above electronic apparatus, the power supply of the apparatus is turned on.

According to the above description, an electronic apparatus, such as the television receiver 2 or the video cassette recorder 3, which serves as a node, has an attribute database for storing attribute information of a service module formed of a single or a plurality of objects. The apparatus also has a service registry that manages the attribute database and switches off the power supply or deactivates the CPU after transmitting the attribute information stored in the attribute database to the service registry of another apparatus and delegating it to respond to queries concerning the attribute information provided from an external source.

Alternatively, an electronic apparatus, such as the television receiver 2 or the video cassette recorder 3, includes an attribute database that stores attribute information of a single or a plurality of objects and also stores, upon being delegated by another apparatus, attribute information of the service modules of the apparatus. The electronic apparatus also has a service registry that manages the above attribute database and responds to queries from an external source concerning the attribute information stored in the attribute information database, and upon being delegated by the above apparatus, also responds to queries concerning the attribute information of the service modules of the above electronic apparatus.

A sequence of steps in the aforementioned power supply control method is now described with reference to the flow chart of FIGS. 2 and 3.

The flow chart indicates process steps in which the service registry 2E of the television receiver 2 delegates the service registry of another electronic apparatus to perform a search operation. In the process steps shown in this flow chart, It is assumed that neither of the service modules of the television receiver 2 or user-level software modules are running.

The process is started with receiving from the power manager 2J to the service registry 2E of the television receiver 2 a message indicating that the power supply is ready to be switched off. Due to this message, the service registry 2E of the television receiver 2 is initiated to delegate a search operation to the service registry of another electronic apparatus.

In step S71, a determination is made of whether the service registry 2E of the television receiver 2 is currently delegated to perform a search operation for another electronic apparatus.

The data structure of the database for storing delegating information concerning another electronic apparatus is indicated by, for example, the one illustrated in FIG. 4. The columns in this structure represent, from the left to the right, "node ID", "attribute information database ID", and "the number of bytes of attribute information". The first line of the table indicates the node ID "BB", the attribute information database "database B", and the number of bytes of attribute information "size B". The subsequent lines are omitted. Such a database concerning the attribute information used for a search operation is stored in, for example, the query database 2H, under the control of the service registry 2E.

Figure 2:
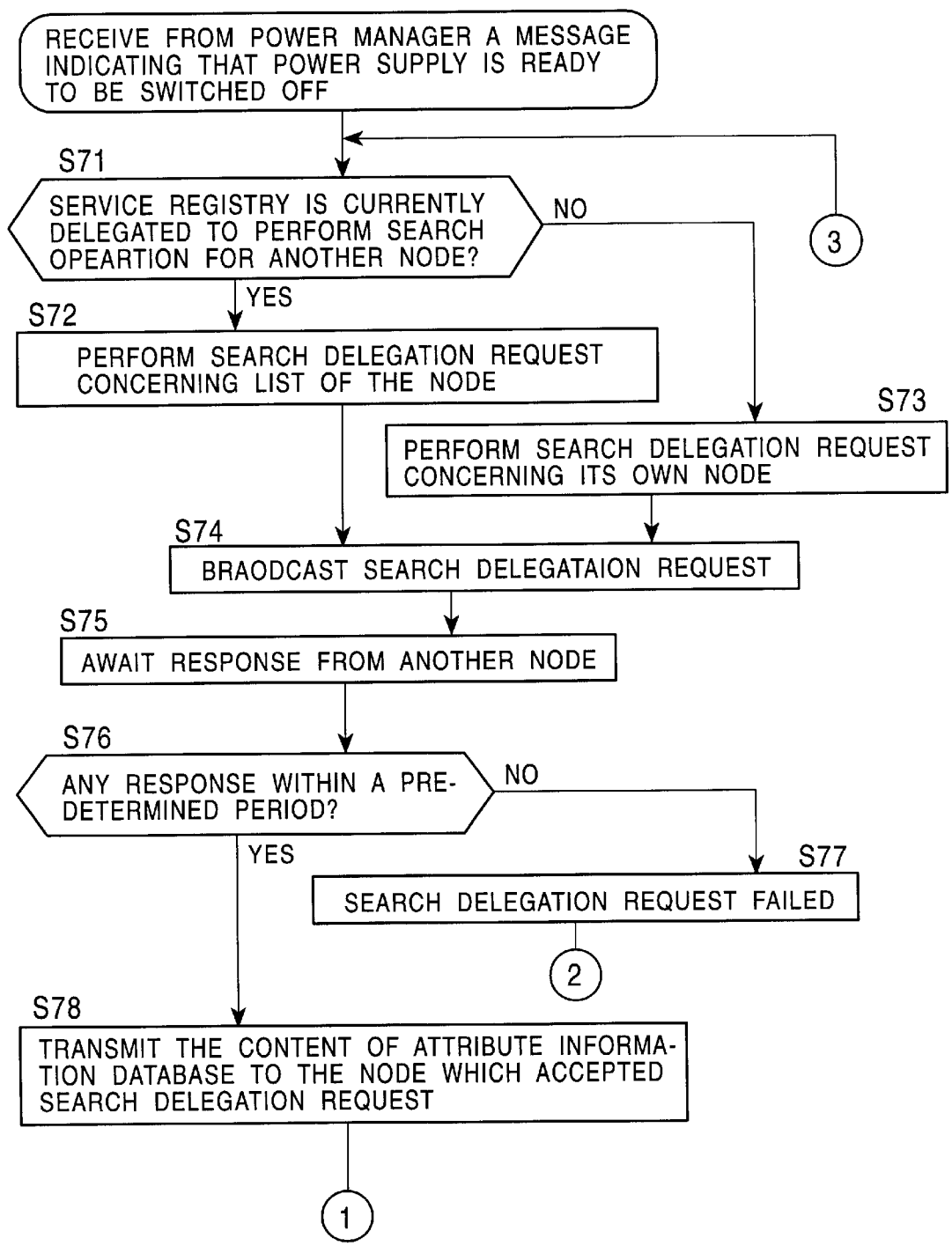
FIGS. 2 and 3 are a flow chart illustrating a sequence of steps of requesting a search delegation immediately before a power supply is switched off.
Figure 3:
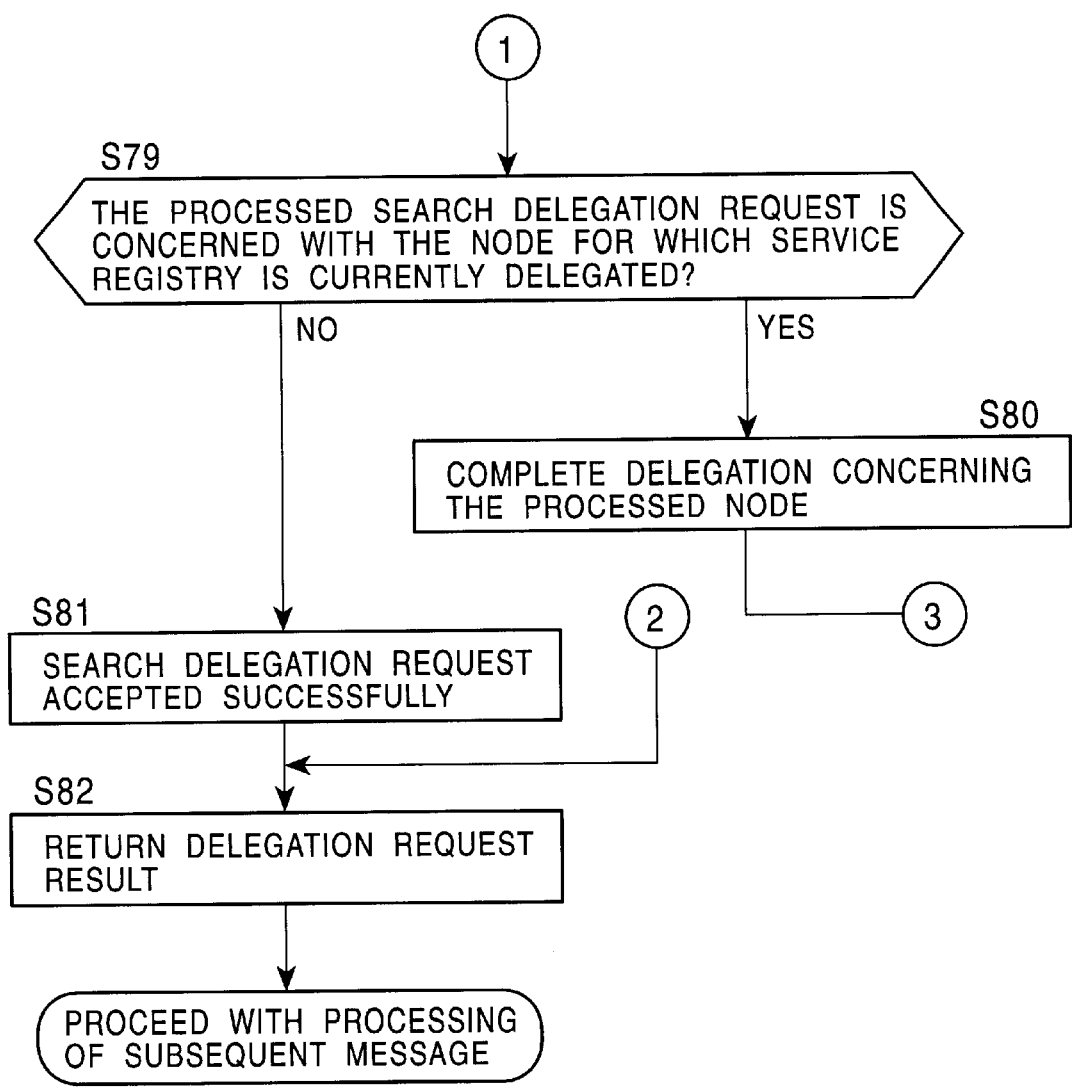

Referring back to the flow chart shown in FIG. 2, it is determined in step S71 by referring to the aforementioned database whether the service registry 2E of the television receiver 2 is currently delegated for another electronic apparatus. If the answer of step S71 is yes, the process proceeds to step S72. If the answer of step S71 is no, the process proceeds to step S73.

If it is found in step S71 that there is any entry in the database shown in FIG. 4, it is necessary to newly delegate such entries to another apparatus starting from the head of the database, i.e., the attribute information concerning the node ID "BB" of the first entry of the database Is to be delegated in step S72. Namely, the node "BB" Is determined to be the delegation target node . The process then proceeds to step S74.

If It Is found In step S71 that there is no entry in the database shown in FIG. 4, it is only necessary to request the attribute information of the television receiver 2 to be delegated to another apparatus In step S73. Accordingly, the nod e ID of the television receiver 2 is determined to be the delegation target node and is referred to as, for example, the node ID "AA". The process then proceeds to step S74.

In step S74, a search delegation request message having parameters, such as the attribute information size and the node ID that is requesting the delegation, is broadcast to unspecified apparatuses. The broadcast operation performed in this step is discussed in detail later.

The reason for broadcasting the size of the attribute information is to determine whether a RAM of another node, which is to accept the search delegation, has a sufficient capacity to store the required attribute information.

The search delegation request message is indicated by, for example, the one shown in FIG. 5. The columns in the message represent, from the left to right, "sender ID", "delegation request ID", and "delegation request content". The "delegation request content" is further divided into "attribute information size" and "node ID". Under the above columns, the sender ID "XXXXXXXX", the delegation request ID "2345", the attribute information size "size B", and the node ID "BB" are indicated.

In step S75, the process goes into the standby position for a predetermined period to await a response from the nodes to which the delegation request has been broadcast. After a lapse of the predetermined period, the process proceeds to step S76.

In step S76, it is determined whether there is any response from the requested nodes within a predetermined period. The service registries of the requested nodes do not respond if they are unable to accept the above delegation request. Accordingly, a response from a requested node indicates that the node is ready to accept the delegation request. If the answer of step S76 is yes, the process proceeds to step S78. If the answer of step S76 is no, the process proceeds to step S77.

As an example of modifications to the parameters included in the search delegation request message, the parameters may also include a flag indicating whether it is necessary to transmit the attribute information. Namely, some nodes may transmit a search delegation request to a plurality of nodes, and if there are nodes which do not require attribute information, the transmission of data is unnecessary. In this modification, if it is found in step S76 that there is no need to transmit the attribute information, it is unnecessary to newly transmit a delegation request since the corresponding node has already received the request.

If it is found in step S76 that there is no answer from the requested nodes, no node will accept the delegation request.

It is thus determined in step S77 that the search delegation request has failed. In this case, the service registry 2E of the television receiver 2 provides the power manager 2J with the information indicating that the CPU should not be deactivated since it is required to respond to a search request. The process then proceeds to step S82. It should be noted that number shown in FIG. 2 proceed to number shown in FIG. 3.

On the other hand, if it is found in step S76 that there is a response within a predetermined period, the process proceeds to step S78 in which the search delegation is requested to the service registry of the node that has accepted the request in step S76. The attribute information, such as the node ID and all the attribute information concerning the service modules of the above node, is then transmitted to the delegated node. The process then proceeds to step S79. It should be noted that number ② shown in FIG. 2 proceed to number ② shown in FIG. 3.

In step S79, the process branches off to steps S80 and S81 according to whether the search delegation requested in step S78 by the service registry 2E of the television receiver 2 is concerned with a node for which the television receiver 2 is currently delegated. If the query asked in step S79 is yes, the process proceeds to step S80. If the query asked in step S79 is no, the process proceeds to step S81.

In step S79, it is determined which node has been processed in steps S74 through S78 by checking target Node variables for storing the nodes to which the delegation request has been broadcast.

If the query asked in step S79 is yes, the search delegation request has been broadcast to the node for which the television receiver 2 is currently being delegated, and it is no longer necessary for the television receiver 2 to delegate such a node. Thus, in step S80, the entry of the corresponding node ID is deleted from the information database shown in FIG. 4. Thereafter, the process returns to step S71 in which the processing is repeated until all the required requests are completed or requests can no longer be transmitted. Upon completing processing concerning all the nodes for which the television receiver 2 is currently delegated, the process proceeds to step S73 in which the television receiver 2 requests its attribute information to be delegated to the corresponding node. It should be noted that number ③ shown in FIG. 2 proceed to number ③ shown in FIG. 3.

Conversely, if the answer of step S79 is no, it is determined in step S81 that all the attribute information has been requested, i.e., the search delegation request has been accepted successfully.

The process proceeds to step S82 in which the service registry 2E of the television receiver 2 reports to the power manager 2J whether the search delegation request has succeeded or failed. If the request ha s been accepted successfully, the power manager 2J switches off the power supply. If, however, the request has not been accepted, the power supply maintains the on state since the CPU should be activated. In step S82, the sequence of steps is completed, and a subsequent message is to be handled.

Figure 6:
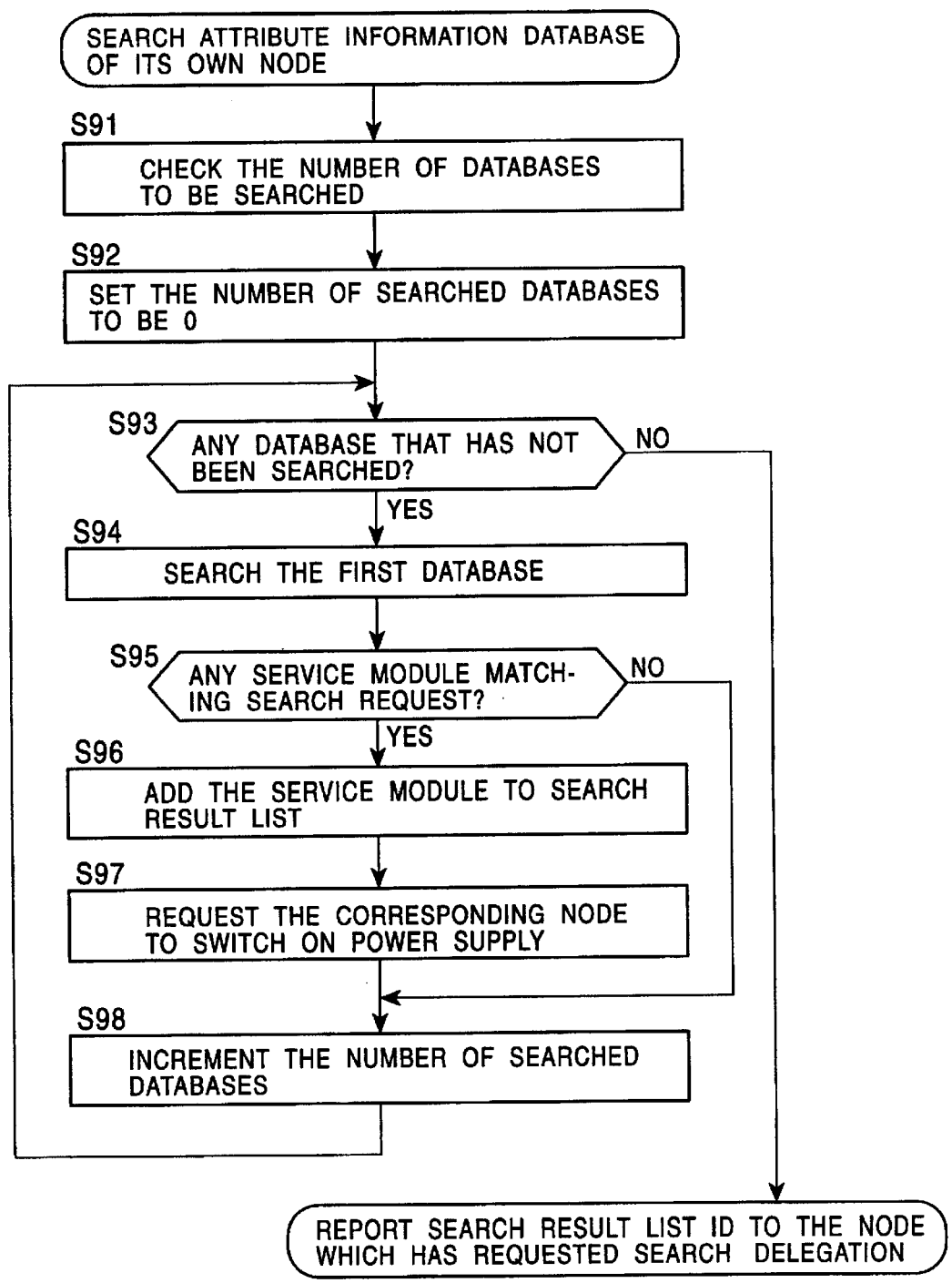
FIG. 6 is a flow chart illustrating a sequence of steps executed when the service registry that has been delegated receives a search request and responds to queries.

A description is now given with reference to the flow chart of FIG. 6 of a sequence of steps executed when the service registry that has been delegated receives a search request and responds to queries. In this flow chart, the service registry 2E of the television receiver 2 has received from the service registry 3E of the video cassette recorder 3 the attribute information of the service modules, i.e., the objects, of the video cassette recorder 3, and has been delegated to respond queries concerning the attributed information.

The service registry 2E of the television receiver 2, which has been delegated to conduct a search operation on behalf of the service registry of the video cassette recorder 3, has an attribute information database of another node, i.e., the video cassette recorder 3, as well as its own database. Accordingly, a modification is required to be made to the normal search operation, and the database search operation should be repeated as many times as the number of databases.

Further, if a search request is concerned with the attribute information stored in the requested database, the service registry 2E of the television receiver 2 is required to send a message to the corresponding node to request it to switch the power on.

The process steps shown In FIG. 6 are started with searching the attribute information database of the television receiver 2 by the service registry 2E.

In step S91, the number of entries in the search information database, such as the one illustrated in FIG. 4, is checked. In this process, the number of entries, such as the node ID "BB", which has requested the television receiver 2 to be delegated to conduct a search operation, is determined to be N. The process then proceeds to step S92.

In step S92, among N number of databases, the number i of databases that have been searched is set to be 0, i.e., i=0. The process then proceeds to step S93.

In step S93, it is checked whether there is any attribute information database that has not been searched. Namely, step S93 branches according to whether the number of databases i that have been searched is smaller than the number N of databases, i.e., i<N. If the query made in step S93 is yes, the process proceeds to step S94. If the answer of step S93 is no, i.e., all the databases have been searched, the IDs included in the search result list are reported to the node which has requested the search delegation, and the process is ended.

In step S94, a search is conducted on the database subsequent to the i-th entry database in the database shown in FIG. 4, i.e., the (i+1)-th entry of the attribute information database. The process further proceeds to step S95.

In step S95, a determination is made of whether there is any service module that matches the search request. If the answer of step S95 is yes, the process proceeds to step 96. In contrast, if the answer of step S95 is no, the process proceeds to step S98.

In step S96, the corresponding service module found in step S94 is added to the list. In this case, since the service module ID has been provided at a node other than the television receiver 2, it is required to be converted before being added to the list. The process then proceeds to step S97.

Since the service module which matches the search request may be communicated, the service registry 2E of the television receiver 2 sends a message to the corresponding node to request it to switch on the power supply. The process further proceeds to step S98.

Upon switching on the power supply, the corresponding node can be searched, and thus, it is no longer necessary to request the search delegation to the television receiver 2. Accordingly, the service registry 2E of the television receiver 2 deletes the entry of the corresponding node from the search information database illustrated in FIG. 4 and also erases the corresponding attribute information database.

At this stage, however, since it is unknown whether the corresponding node will be communicated with, the television receiver 2 may be immediately requested again to conduct a search operation. Thus, step S98 may be modified such that the corresponding database is not deleted.

In step S98, the number i of searched databases is incremented, i.e., it is set that i=i+1. The process then returns to step S93.

The search list may be modified to the format shown in FIG. 7 so that service modules belonging to a plurality of nodes can be reported in a single message. The columns in the format include, from the left to the right, "search ID", "number of nodes", "node ID", "number of corresponding modules", and a plurality of "corresponding module ID". The first line indicates that the search ID is "1234", the number of nodes is "2", the node ID is "BB", the number of corresponding modules is "n", and the corresponding module IDs are "B1", . . . , "Bn". The second line represents the node ID "CC" and the number of corresponding modules "m", and the corresponding module IDs "C1", . . . , "Cm". By utilizing the above type of message format, a search result can be transmitted in a single message to service modules belonging to a plurality of nodes.

An example of modifications made to the power supply control method is now described with reference to the flow chart shown in FIG. 8.

Upon receiving a search result from another node, the service registry creates a proxy representing the destination of another node. In this case, the proxy may be best deleted when the search result list is no longer required. Accordingly, the service registry may not be informed that the list is unnecessary until communications are over. It is, however, a waste of the memory capacity if the list is unnecessarily stored. Additionally, when a search result is newly transmitted from another node, the list should be updated and changed, i.e., certain processing should be executed on any event.

In order to avoid the above-mentioned waste of memory, for determining whether the proxy can be deleted, a node to be communicated with is reported to the service registry before informing that the list is no longer necessary. Then, when all the communications are actually over, the end of communications is reported to the service registry.

In this case, in place of communicating with a destination contained in the list, a node to be communicated with may be selected from the destinations included in the list and may be reported to the service registry. The processing required for the above arrangement may be divided into steps needed for the overall list and steps only required for some destinations included in the list. The proxies of destinations which are not to be communicated with are deleted when the list is no longer required, while the proxies of destinations which are to be communicated with are erased when the communications are over. The number of destinations to be communicated with is not restricted.

Figure 8:
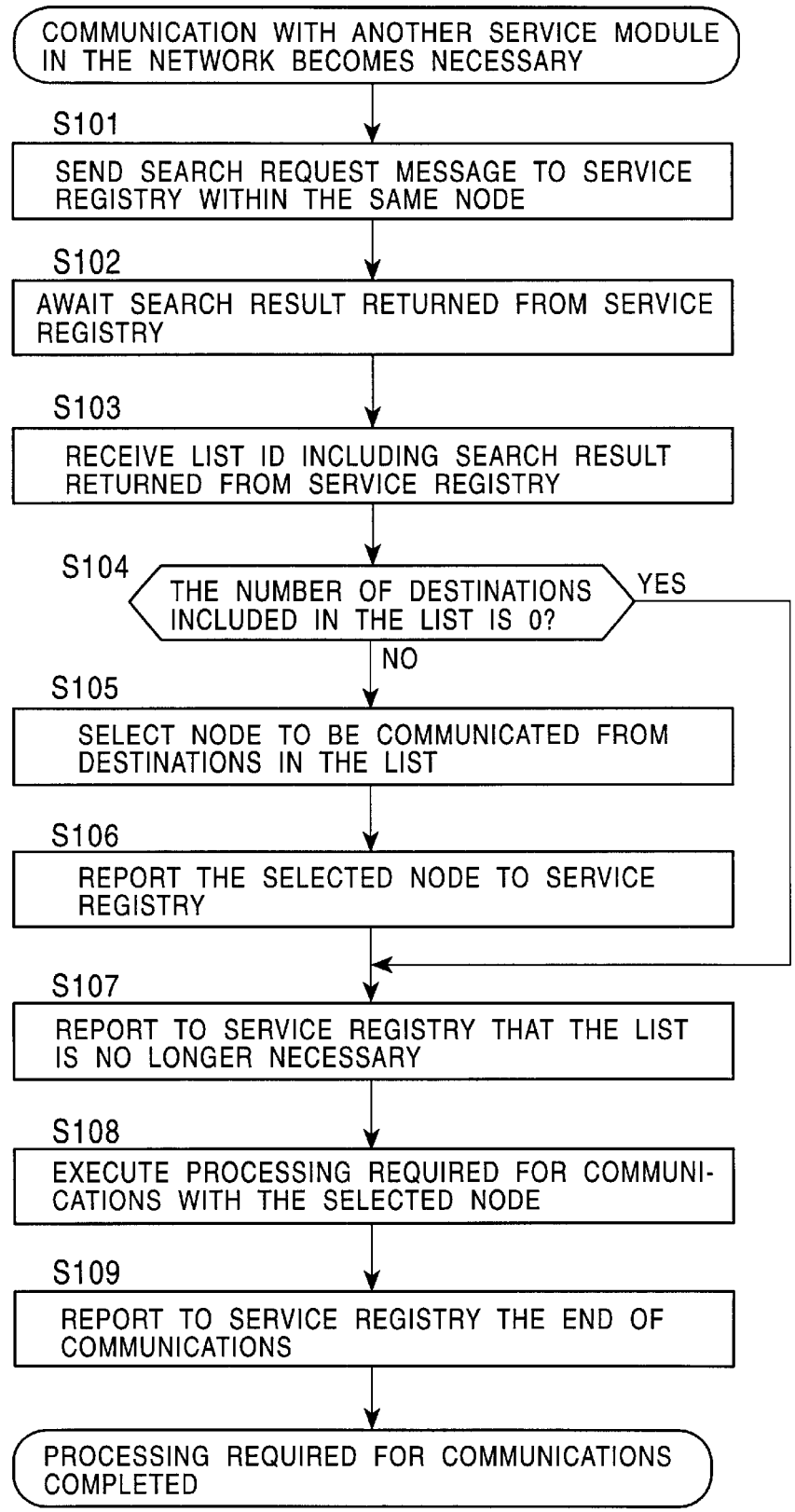
FIG. 8 is a flow chart illustrating a modification made to a power supply control method employed when it becomes necessary to communicate with another service module.

The aforementioned process steps shown in FIG. 8 are started when it becomes necessary to perform communications with another service module in the network.

In step S101, a search request message is sent to the service registry within the same node, and in step S102, the process waits for the search result returned from the service registry. Subsequently, in step S103, a list ID including the search result returned from the service registry is received. The process then proceeds to step S104.

In step S104, a determination is made of whether the number of destinations Included in the list is zero. If the answer of step S104 is yes, the process proceeds to step S107. Conversely, if the answer of step S104 is no, the process proceeds to step S105.

In step S105, a node to be communicated with is selected from the destinations contained in the list, and in step S106, the selected node is reported to the service registry. The process then proceeds to step S107.

In step S107, it is reported to the service registry that the list is no longer necessary. Subsequently, processing required for communications with the selected node is executed in step S108, and the end of communications is reported to the service registry in step S109. The process steps are thus completed.

According to the aforementioned process, a node to be actually communicated with is informed to the service registry, thereby enhancing the efficiency of processing.

Figure 9:
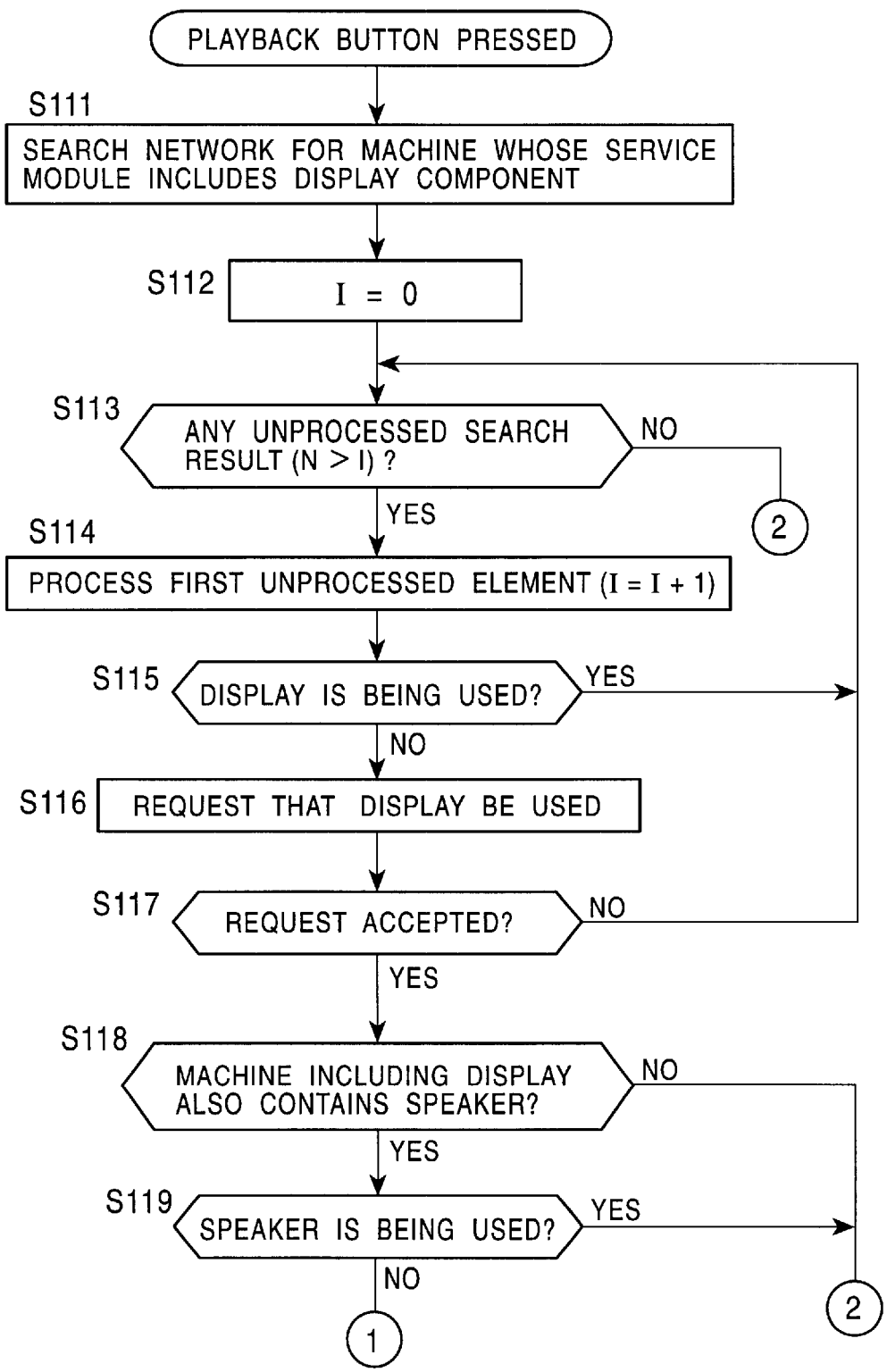
FIGS. 9 and 10 are a flow chart illustrating a sequence of steps executed by pressing a playback button of a video cassette recorder.
Figure 10:
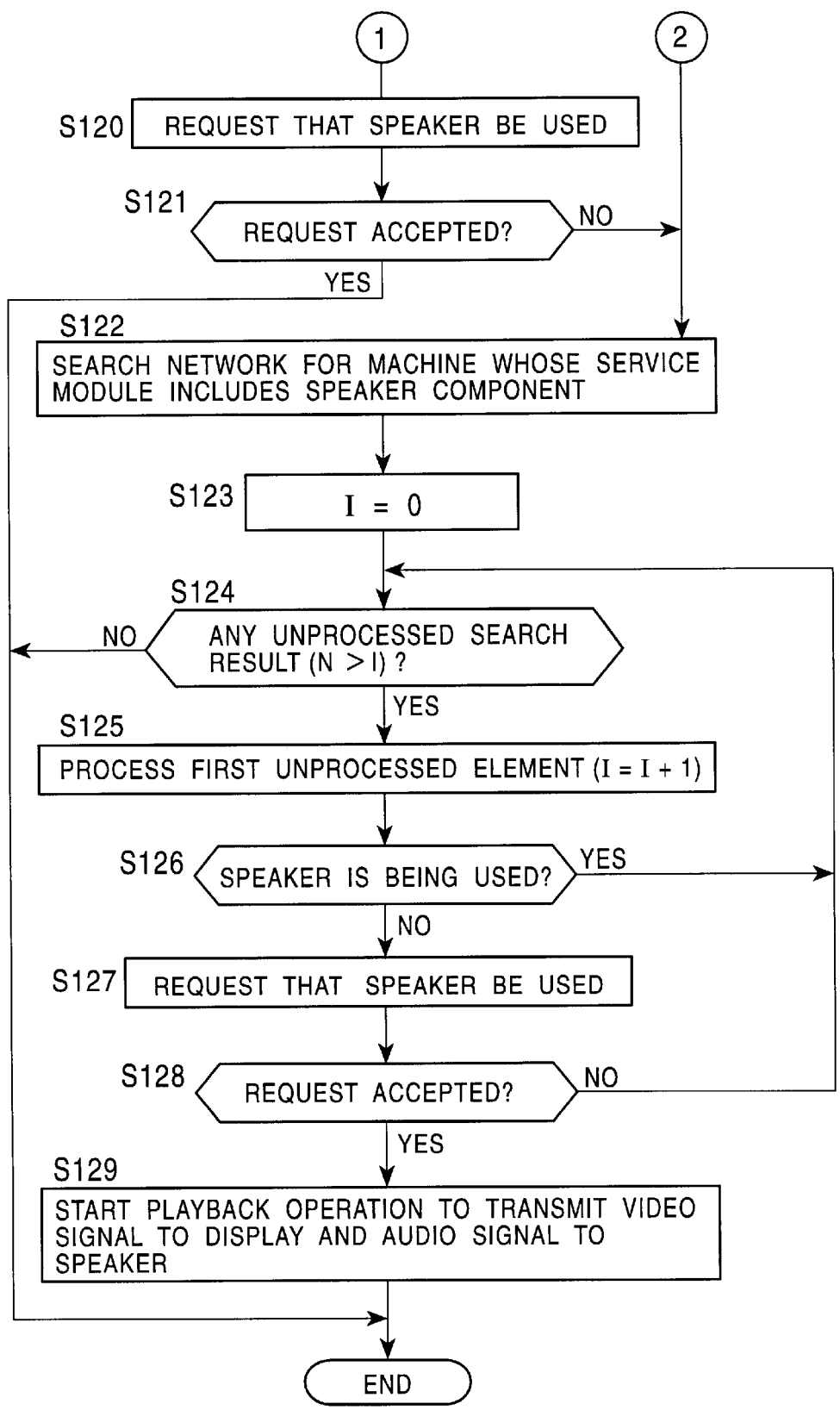

A description is now given with reference to the flow chart shown in FIGS. 9 and 10 of a specific example of the specific power supply control method, i.e., a sequence of steps started with the generation of an event, such as pressing a playback button of a video cassette recorder.

In this example, a simple configuration is considered in which household AV machines are connected to a digital network, and data can be distributed to all the AV machines by using software programs. A television receiver and a video cassette recorder are connected to the digital network.

The process steps illustrated in FIGS. 9 and 10 are started when it becomes necessary to perform communications between the service modules of the machines connected to the network. More specifically, the process steps are started when the user inserts a video cassette into the video cassette recorder and presses the playback button. Namely, this process is initiated by the generation of an event, i.e., pressing of the playback button of the video cassette recorder.

In step S111, a search is conducted on the network for a machine whose service module includes a display component. Then, in step S112, the variable I representing the number of processed databases is set to be 0. The process further proceeds to step S113.

It is determined in step S113 whether there is any unprocessed database. More specifically, the number of databases to be processed is indicated by N. If N is greater than I, there remain databases to be processed, and the process proceeds to step S114. If N is not greater than I, all the search operations are over, and the process proceeds to step S122. It should be noted that the number ② shown in FIG. 9 proceed to the number ② illustrated in FIG. 10.

In step S114, the first unprocessed element is processed. More specifically, since the number of processed databases is I, the (I+1)-th database is processed. Then, the variable I is incremented, i.e., I=I+1. The process then proceeds to step S115.

A query is made in step S115 of whether the display is being used. If the answer of S115 is yes, the process returns to step S113. On the other hand, if the answer of step S115 is no, the process proceeds to step S116.

In step S116, it is requested that the display be used. It is then determined in step S117 whether the request has been accepted. If the query asked in step S117 is yes, the process proceeds to step S118. If, however, the query asked in step S117 is no, the process returns to step S113.

It is then checked in step S118 whether the machine including the display also contains a speaker. If the answer of step S118 is yes, the process proceeds to step S119. In contrast, if the answer of step S118 is no, the process proceeds to step S122.

A query is made in step S119 whether the speaker is being used. If the query made in step S119 is yes, the process proceeds to step S122. If the query made in step S119 is no, the process proceeds to step S120. It should be noted that the number ① shown in FIG. 9 proceed to the number ① illustrated in FIG. 10.

In step S120, it is requested that the speaker be used. A determination is then made in step S121 of whether the request has been accepted. If the query made in step S121 is yes, the process is ended. If the query made in step S121 is no, the process proceeds to step S122.

In step S122, a search is conducted on the network for a machine whose service module includes a speaker component. Subsequently, in step S123, the variable I representing the number of searched databases is set to be 0. The process then proceeds to step S124.

It is determined in step S124 whether there is any unprocessed database. More specifically, the number of databases to be searched is determined to be N. It is checked in step S124 whether N is greater than I. If the answer of step S124 is yes, the process proceeds to step S125. If, however, the answer of step S124 is no, the process is ended.

In step S125, the first unprocessed element is processed. Namely, the (I+1)-th database subsequent to the I-th database is processed, and the variable I is incremented, i.e., I=I+1. The process then proceeds to step S126.

A query is made in step S126 whether the speaker is being used. If the query made in step S126 is yes, the process returns to step S124. If the query made in step S126 is no, the process proceeds to step S127.

In step S127, it is requested that the speaker be used. A determination is then made in step S128 of whether the request made in step S127 has been accepted. If the answer of step S128 is yes, the process proceeds to step S129. If the answer of step S128 is no, the process returns to step S124.

In step S129, a playback operation is started to transmit a video signal and an audio signal to the display and the speaker, respectively. The process is then completed.

In the aforementioned process, if it is found in step S113 or S124 that there is no unprocessed database, the occurrence of an error may be indicated to discontinue the process. In this case, an error message may be indicated not only on a display unit, such as a liquid crystal panel or an error lamp, provided for the video cassette recorder, but also on a network controlling terminal.

If the machines are directly connected via analog communication lines, a software module for controlling the connection may be created, and the user may control the connection by inputting the connecting information. To achieve this modification, it is required that a machine having an input unit and a display unit be contained in the network.

According to the foregoing description, the power supply control method has an attribute information acquiring step of acquiring attribute information of a service module formed of a single or a plurality of objects. The power supply control method also has an attribute information management step of switching off the power supply after transmitting the attribute information acquired in the above attribute information acquiring step to the service registry of another electronic apparatus and delegating it to respond to queries concerning the attribute information provided from an external source.

Alternatively, the power supply control method includes an attribute information acquiring step of acquiring attribute information of a service module formed of a single or a plurality of objects and also acquiring, upon being delegated by another electronic apparatus, attribute information of the service modules of the electronic apparatus. The power supply control method also includes an attribute information management step of responding to queries concerning the attribute information acquired in the above attribute information acquiring step and, upon being delegated by the above apparatus, concerning the attribute information of the service modules of such an apparatus.

Communications performed among a service registry and service modules provided for an electronic apparatus are now discussed.

The service modules are operable in cooperation with each other, for example, a processing request is provided between the service modules by sending a message. As information transfer means employed among the service modules, one-to-one communications performed by using message queue and communications performed by using an event that can be transmitted to unspecified receivers are used in each node.

The service modules defined in this specification include not only machines that implement certain functions, but also programs stored in a memory and run by a CPU. For explaining program service modules, instead of using the overall execution means, an object-oriented model is used in which the operation of each service module for implementing a function is described. It is assumed that service modules are concurrently processed if the time sharing operation is performed on the same CPU or parallel processing or distributed processing is executed by using a plurality of CPUs.

In the present invention, it is assumed that each electronic apparatus, which serves as a node, is generally provided with a plurality of service modules, and that a plurality of nodes are connected via a network.

A discussion is first given of a search operation performed in the state in which power of the basic node is switched on. A service module, which is to communicate with a service module having a specific function or an attribute, sends a search request message to the service registry within the same node.

In response to the above search request, the service registry checks whether there is any service module matching the above request within its own node by utilizing the service module information managed by the service registry. Simultaneously, the service registry requests a broadcast manager to transmit the search request to the entire network.

Upon receiving a broadcast message representing the search request from the network, the broadcast manager of each node delivers the search request to the service registry within its own node. The service registry, which has received the search request from without its node, checks whether there is any service module matching the search request by using the service module information managed by the service registry, in a manner similar to the case where the service registry receives the search request from within its node. If there is any service module that coincides with the search request provided from outside its node, a search result is reported to the service registry which has transmitted the search request.

The service registry, which has received a search request from within its node, creates a list based on the search result obtained by itself while waiting for search results to be returned from other service registries via the network. Upon receiving search results from other service registries, the service registry sequentially adds them to its own list. The service registry, which has received a search request from within its node, creates its search result, and then, informs the search result list ID after a lapse of a prescribed time. In this case, the prescribed time may be zero.

The service registry that has provided the search request checks the content of the list returned from the service registry that has conducted the search, and communicates with mailboxes of the service registries contained in the list. When the service registry no longer requires the list, it transmits a message to the service registry that has conducted the search. In response to the message, the service registry erases the list, and thus, search results returned from other nodes afterwards are nullified.

If search results are returned from other nodes before erasing the list after the list ID has been informed to the service registry that has requested the search, the search results may be added to the list, and an event representing that the content of the list has been updated may be generated. The service registry is then required to check the generation of an event.

Processing executed by each service module is now discussed with reference to the flow charts shown in FIGS. 11 through 16.

A description is sequentially given by referring to the flow charts in the following order: processing by a service module that transmits a search request to a service registry, processing by a service registry that receives a search request from a service module, processing by a service registry that receives a search request from a service registry of another node, processing by a service registry In response to a search result returned from a service registry of another node, a method for adding a new result to a search result list while the list being processed, and providing a delegation request to a service registry of another node after indicating that a search result is no longer required.

A sequence of process steps of transmitting a search request to a service registry in order to communicate with another service module is first discussed with reference to the flow chart of FIG. 11.

Figure 11:
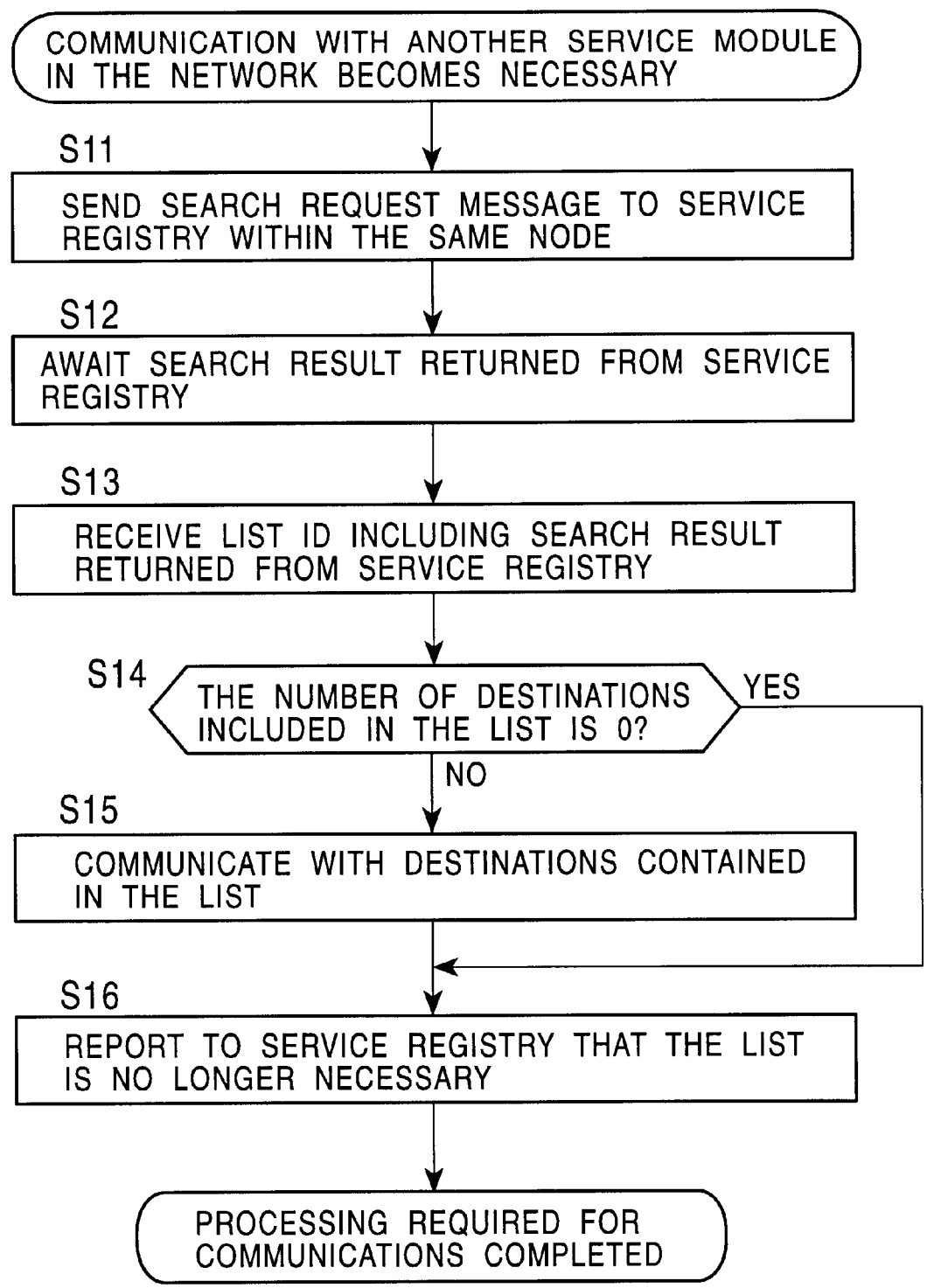
FIG. 11 is a flow chart illustrating a sequence of steps of transmitting a search request to a service registry in order to communicate with another service module.

The process steps shown in FIG. 11 are started when it becomes necessary to communicate with another service module within a network. More specifically, the process is initiated when it becomes necessary to communicate with a service module having a specific function or a software module providing a specific function within the network.

In step S11, a search request message is sent to the service registry within the same node. More specifically, a search request including the type, at tribute information, and position information of a service module to be communicated with is transmitted to the service registry within the same node. The process then proceeds to step S12.

In step S12, the process awaits until a search result is returned from the service registry. Under an environment of parallel processing, other processing may be executed while waiting for a search result. The process then proceeds to step S13.

In step S13, a list ID, for example, a list number, including a search result returned from the service registry is received. If an object-oriented model is used in this process, destinations to be communicated with an object representing the list are received, and destinations of service modules which match the search request and the number of such modules are obtained by communications with the list. In practice, however, direct data, such as memory addresses of the array data including the destinations of service modules to be communicated with, may be received in step S13. The process then proceeds to step S14.

In step S14, the number of destinations contained in the list is checked. More specifically, a determination is made of whether the number of destinations included in the list is zero. If the answer of step S14 is yes, there is no service module to be communicated with, and the process proceeds to step S16 in which it is reported to the service registry that the list is no longer required. If the answer of step S14 is no, the process proceeds to step S15.

In step S15, communications are performed with a destination contained in the list. For example, if a video cassette recorder is searching for a display on a household AV machine network, communications are made until one of the available destinations contained in the search result is selected. If a television receiver is to display a channel list, communications are made to all the usable tuners. In any case, the service module may use the search list at its discretion without being controlled by the service registry. The process further proceeds to step S16.

In step S16, it is reported to the service registry that the list is no longer necessary. As ID information for specifying the unnecessary list, the list ID received in step S13 is used. The service registry then specifies the search request based on the above information and performs the required processing. The process executed for communicating with other service modules is then completed.

The aforementioned process may be ended before all the communications with other service modules are over. For example, if a video cassette recorder has found an available display, the search result list is no longer required, and thus, the processing in step S16 may be executed.

Figure 12:
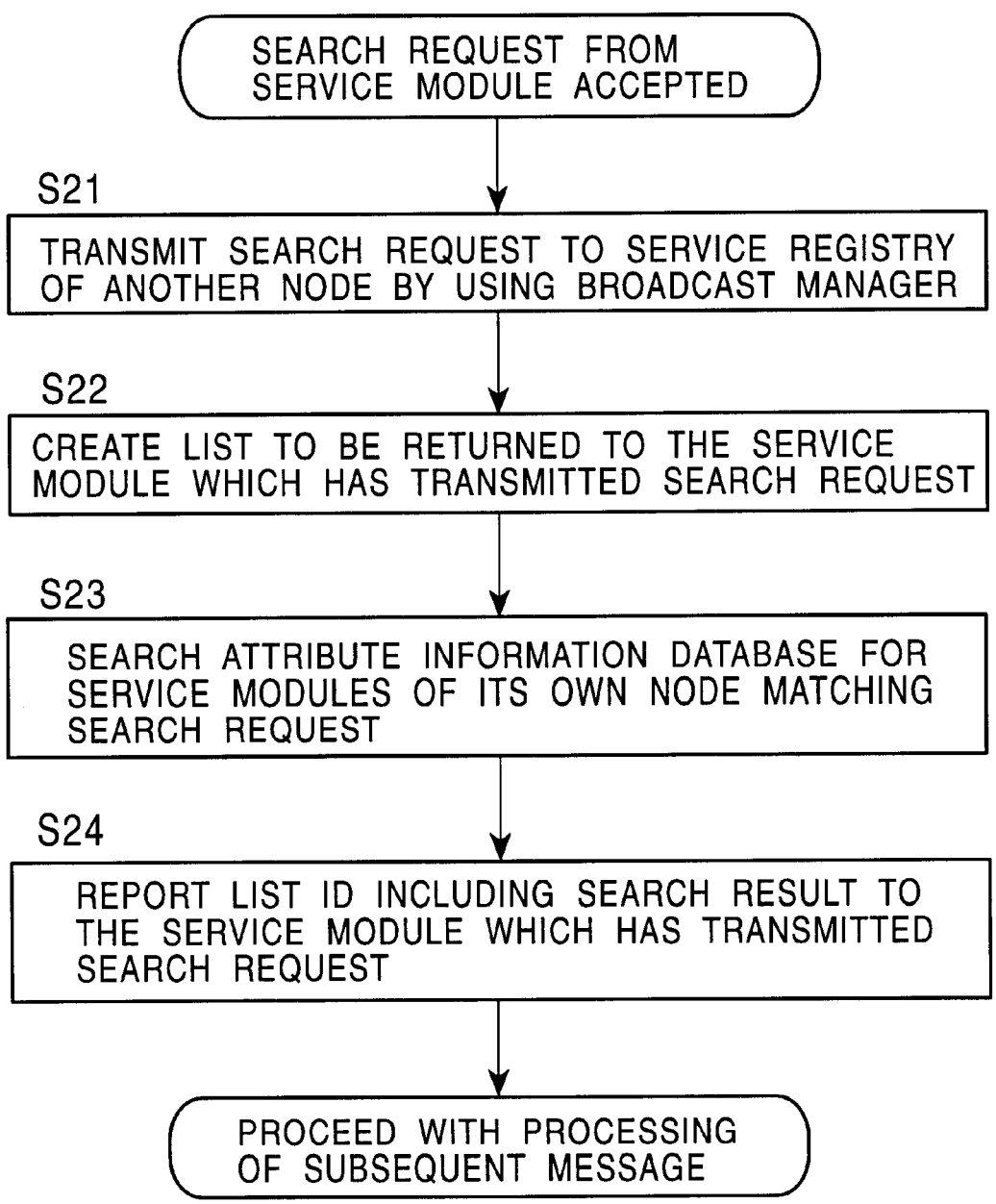
FIG. 12 is a flow chart illustrating a sequence of steps of responding to a search request transmitted from a service module of the same node.

A description is now given with reference to the flow chart illustrated in FIG. 12 of a sequence of process steps of responding to the search request transmitted in step S11 of FIG. 11. The process steps begin when the service registry receives a search request from a service module within the same node.

In step S21, a search request is transmitted to the service registry of another node by using its broadcast manager. Namely, the broadcast manager is requested to broadcast the search request to the service registries of other nodes. By use of the above model in this processing, the network is transparent to normal service modules. In this embodiment, independent functions, such as the broadcast manager and the service registry, are achieved by the different modules. However, a service module, which serves as both broadcast manager and service registry, may be implemented.

The content of the broadcast message sequentially includes a broadcast header and a search request. The broadcast header further includes an ID for specifying the original node which has requested the broadcast message, an ID representing that the search request is to be addressed to the service registry, and a search ID for specifying the search request required when the service registry replies. The process then proceeds to step S22.

In step S22, a list ID, which enables the service module which has transmitted the search request to specify the search result, is provided. In accordance with the ID, the data structure, such as the data array, is created. Since it is necessary to add a search result, which will be returned from a node, to the data structure, the relationship between the search ID contained in the broadcast message sent in step S21 and the data structure ID created in step S22 is recorded. The data structure ID, which depends on the programming language or the operating system (OS) to be implemented, uses the object ID, the memory address, or an ID managed by the service registry. The process further proceeds to step S23.

In step S23, a search is conducted on the attribute information database for service modules of its own node that match the search request, and the IDs of such service modules are added to the data structure created in step S22. At this stage, the search result only contains the service modules within its own node. The process then proceeds to step S24.

In step S24, the list ID created in step S22 is reported to the service module that has transmitted the search request. The ID may be created in any format since it is referred to only within the same node, and thus, it is only essential that the ID is compatible within the same node. The processing executed by the service registry which receives the search request from the service module is then completed.

In practice, further processing is required when a response to the broadcast search request is returned in step S21. Such processing is, however, to be treated as processing to be executed on another message.

Figure 13:
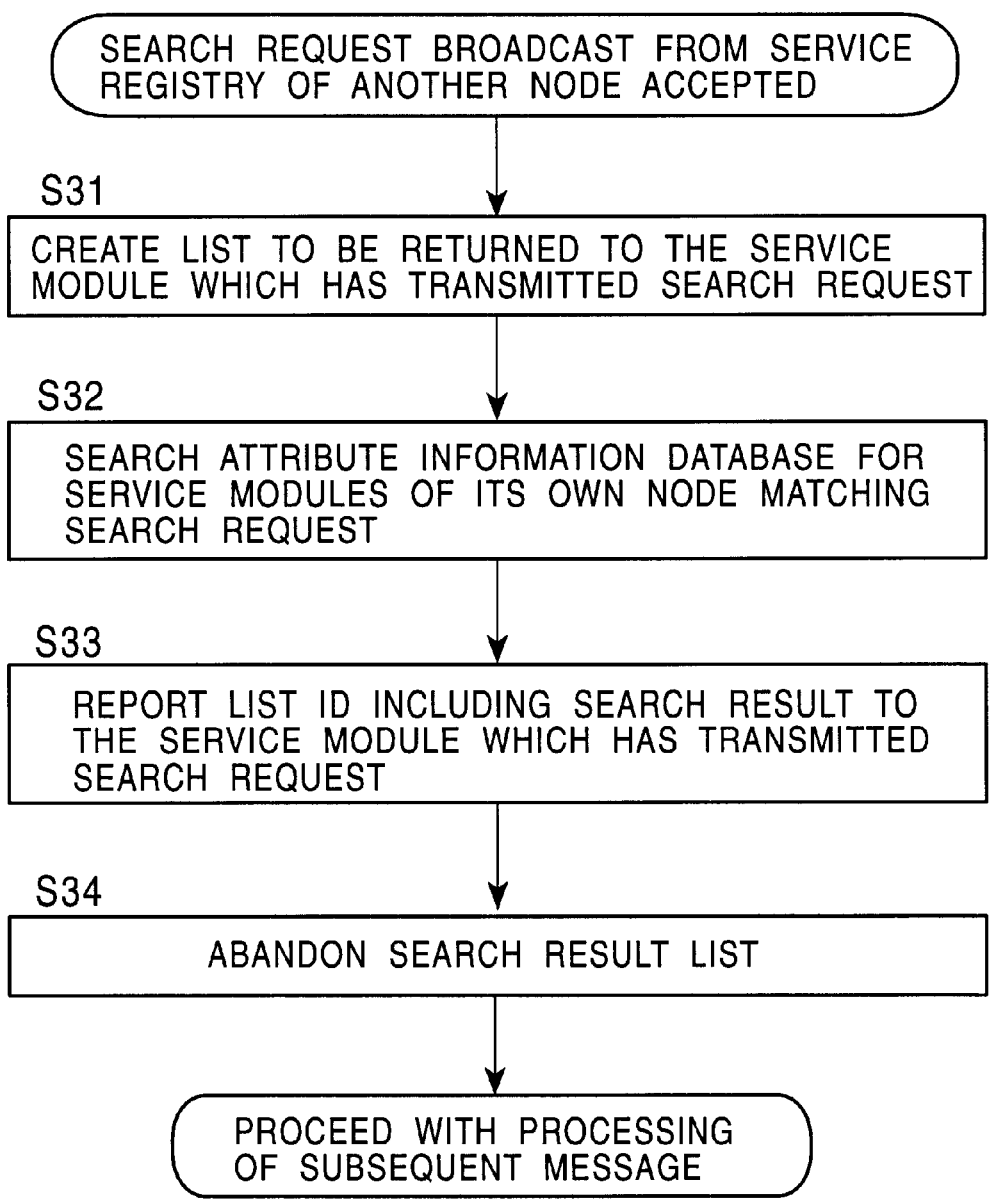
FIG. 13 is a flow chart illustrating a sequence of steps of responding to a search request broadcast by another node.

A description is further given with reference to the flow chart shown in FIG. 13 of a sequence of steps of processing by a service registry that has received a search request broadcast by another node in step S21 of FIG. 12.

The sequence of steps are basically similar to those performed when the service registry receives a search request from a service module within its own node, except that broadcasting executed in step S21 is not performed and that not only the list ID, but also the list content, are reported for transmitting a search result among nodes.

The steps illustrated in FIG. 13 are commenced by receiving a search request form the service registry of another node. A list representing the data structure or the data array, used for storing information to be returned to the service registry that has transmitted the search request, is prepared in step S31. The process then proceeds to step S32.

In step S31, the list to be returned to the service registry is created. Then, in step S32, a search is conducted on an attribute information database for the service modules of its own node that match the search request, and the IDs of the matched service modules are added to the data structure generated in step S32. At this stage, the search result only contains the service modules within the same node. The process then proceeds to step S34.

In step S33, a list of the service module IDs obtained in step S32 is reported to the node that has transmitted the search request. The list reported in step S33 differs from the list representing the entire data structure created in step S31 and only indicates the individual elements and the number of such elements. The search ID for specifying the search request is reported together with the search result.

The reason for reporting all the search content is to eliminate the necessity of providing communications among the nodes, which would otherwise be required to confirm the elements afterwards. Another reason is to determine when to abandon the list within the same node when the list is no longer required.

Instead of reporting all the search content, only the data structure ID may be reported. However, the reason for reporting the data structure ID in step S24 of the flow chart illustrated in FIG. 12 is to merely inform that the list content has been updated by an additional search result returned from another node in step S22. On the other hand, the search result obtained in step S32 and reported in step S33 is restricted to the same node, which will not be changed later. Accordingly, the search content can be safely reported in step S33.

Since the service module IDs reported in step S33 are to be processed in another node, the number of bits is required to be defined within the network. This is significantly different from the previous processing shown in FIG. 12 in which each node is allowed to use any desired IDs.

In step S34, the data structure created in step S32 and added to by a new element in step S33 is abandoned. If only the data structure ID is reported in step S34, the search result list should not be discarded immediately but may be abandoned when a list abandon request message is received. It is, however, necessary to perform additional processing for discarding unnecessary data if the node is disconnected from the network.

The processing executed by a service registry in response to a search request from the service registry from another node is then completed.

A sequence of steps executed by the service registry that has received the search result reported in step S33 of FIG. 13 is now described with reference to the flow chart of FIG. 14.

Figure 14:
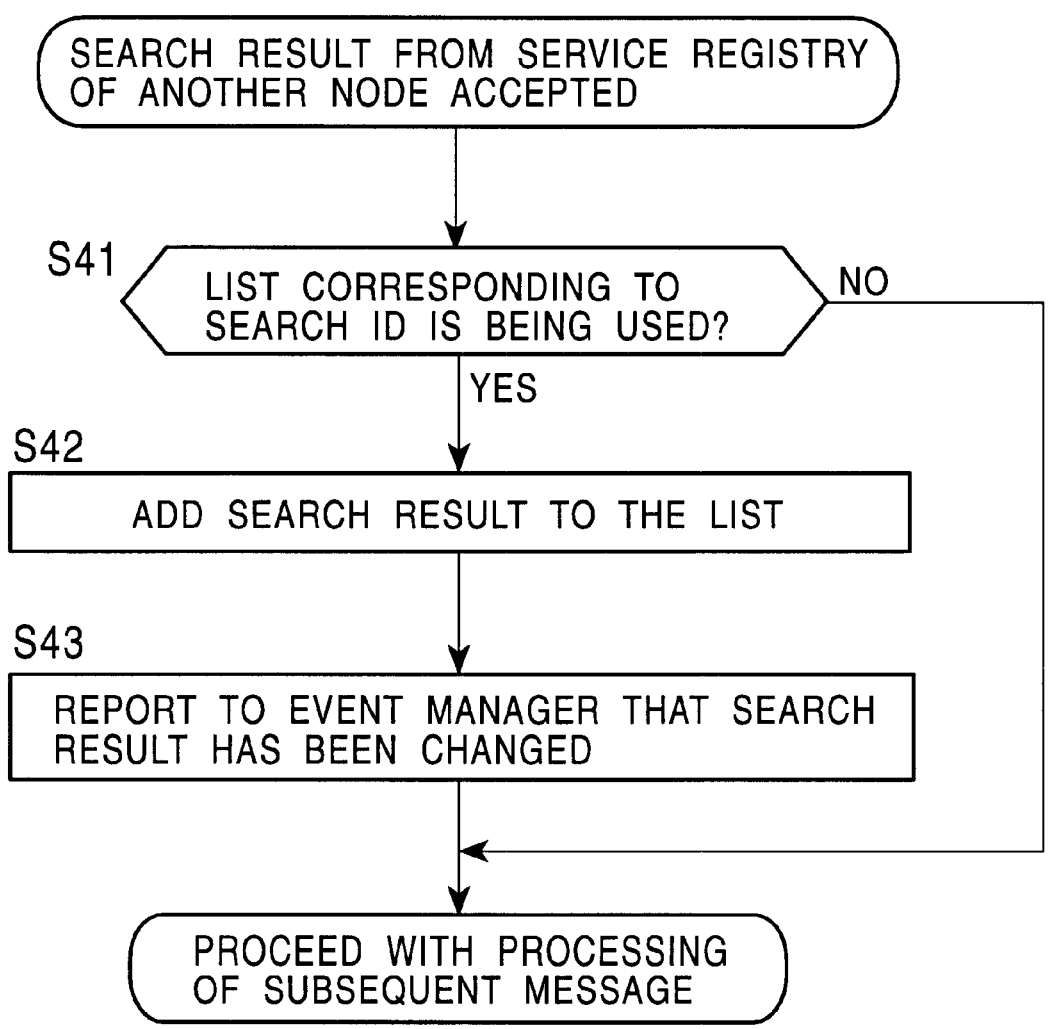
FIG. 14 is a flow chart illustrating a sequence of steps of processing executed on a search result received from the service registry of another node.

The process steps shown in FIG. 14 are initiated by receiving a search result message from the service registry of another node. This message includes the search ID added to the search request broadcast in step S21 shown in FIG. 12 and the list ID and the numbers of the service registries that have matched the search request.

In step S41, the data structure ID corresponding to the search ID is specified by using information stored in step S22 shown in FIG. 12, and it is checked whether the specified data structure ID is still being used. If the answer of step S41 is yes, it is not yet reported in step S16 shown in FIG. 11 that the list is no longer required, and the process proceeds to step S42. If the search result returned from another node is unnecessary, the answer of step S41 is no, and the process is ended.

In step S42, the service module IDs contained in the received search result are added to the data structure checked in step S41. The process further proceeds to step S43.

In step S43, an event representing that the content of the data structure has been changed is transmitted to the event manager, thereby enabling service modules which are interested in the data structure to perform the required processing. As a parameter of the event, the ID of the data structure that has been changed in step S42 is used. The aforementioned process steps are then completed.

Although the event manager is used in step S43, the service registry may record the service module which has transmitted the search request and may directly communicate with it.

If the number of elements in the search result is zero, the search result is not changed at all, and the processing in step S43 may be skipped. Accordingly, the number of elements in the search result may be checked prior to step S43. However, the number of elements may be checked by the service module which has transmitted the search request, or the search result may not be reported at all if the number of elements is zero. Thus, the above modification is not shown in the flow chart of FIG. 14

Further, the following modification may be considered. Between steps S32 and S33 in the flow chart of FIG. 13, the process waits for a reply from another node for a predetermined time. Once a search result is reported to the node that has transmitted the search request, additional processing may not be executed. In this case, the process in step S41 waits for a reply from another node, and step S43 is made unnecessary.

The processing, which may be executed in step S43 by the node that has transmitted the search request in response to a change in the search result, varies depending on the situation. Accordingly, such a variety of processing cannot be indicated in the flow chart. For example, if a video cassette recorder has searched for an available display and has found one, no processing is required in step S43. If the video cassette recorder has not yet found an available display, it is required to check new elements added to the search result. If a channel list usable by all the tuners is to be displayed, communications are made to obtain channel information of tuners added to the search result in step S43.

Figure 15:
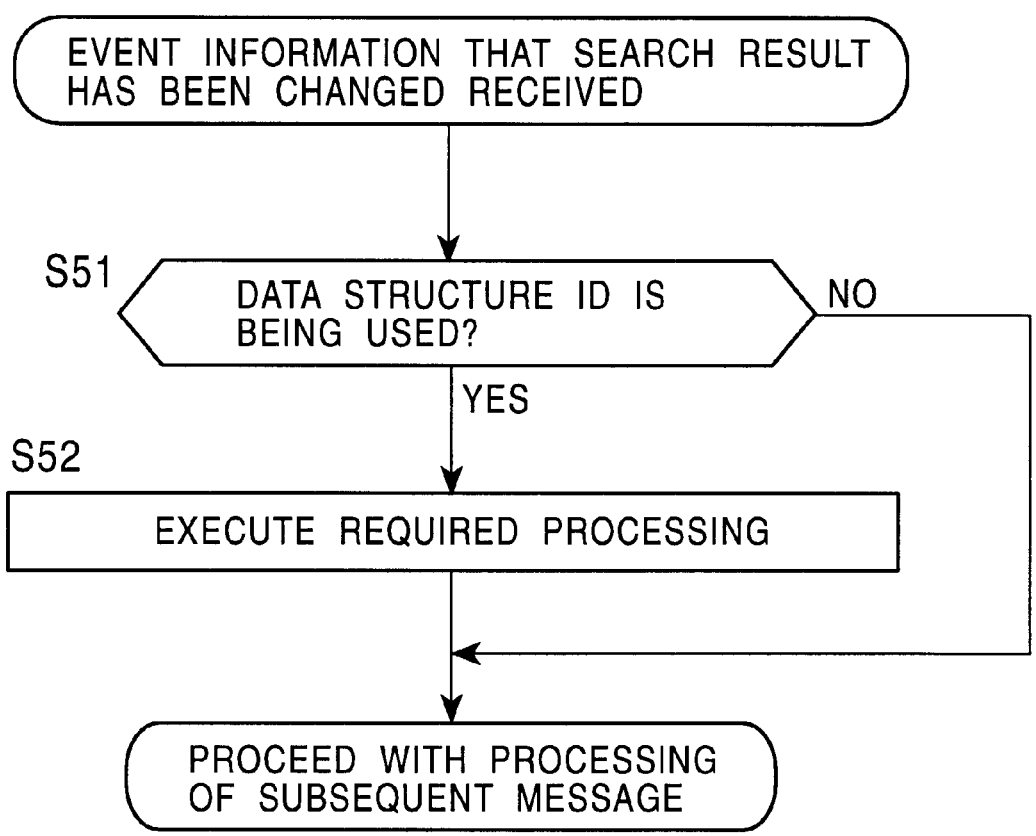
FIG. 15 is a flow chart illustrating a sequence of process steps executed when the service registry that has transmitted a search request has received an event representing that the search result has been changed.

A description is now given with reference to the flow chart shown in FIG. 15 of a sequence of process steps executed when the service registry that has transmitted a search request has received an event representing that the search result has been changed.

The steps are started with receiving an event indicating that the search result has been changed. Namely, since the service registry has reported a change in the search result through the event manger in step S43 of FIG. 14, the service registry that has transmitted the search request receives event information. Alternatively, an event message is directly sent from the service registry of another node. If the event manager is used, it is necessary for the service registry to Inform the event manager before step S14 of FIG. 11 that a change in the search result should be transmitted.

It is checked in step S51 whether the ID of the changed data structure coincides with the ID that the service registry is currently using. This step is required because unnecessary events may be reported since events are usually identified by their type rather than their ID when they are reported. Even if an event is directly reported by the service registry, the above confirmation is worth performing, though it is not essential. If the answer of step S51 is yes, the process proceeds to step S52. If the answer of step S51 is no, the sequence of steps is completed.

In step S52, the required processing is executed depending on the situation, as discussed with reference to step S43 of FIG. 14. Then, the aforementioned process steps are completed.

Figures 16, 17:
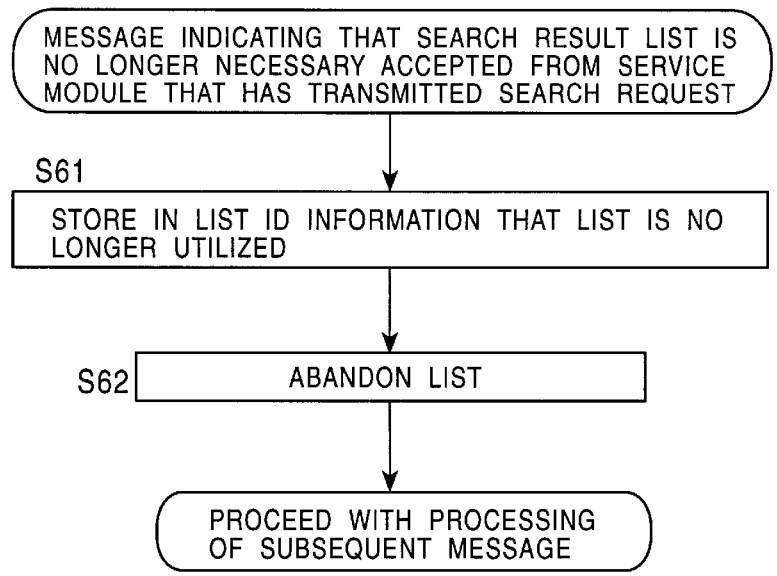
FIG. 16 is a flow chart illustrating a sequence of steps of processing executed when a message indicating that the search result list is no longer required is received from the service registry that has transmitted a search request.
FIG. 17 illustrates a first example of a service module database possessed by a service registry.

A description is now given with reference to the flow chart of FIG. 16 of a sequence of steps of processing executed when the service registry has received a message sent in step S16 of FIG. 11 indicating that the search result list is no longer required.

The process steps are commenced when the service registry receives the above type of message. The list contains the ID for specifying the list as a parameter of the message.

In step S61, information indicating that the list is no longer utilized is stored in the list ID. This information is used for determining the query made in step S41 of FIG. 14 under the situation in which a search result may be returned from the service registry of another node. The information may be stored by, for example, flagging in the ID to indicate that the list is no longer used. The process further proceeds to step S62.

In step S62, the search result list is abandoned. As a modification, in place of discarding the list, a plurality of lists may be pooled to reuse them. In this case, the list IDs may be managed by the service registry in order to reuse the same object ID and the memory addresses, and the content of the list may be erased. Then, the aforementioned process is completed.

As a modification made to the above process steps, if there is no list that matches the ID, it may be determined that the list is no longer used. Accordingly, step S61 may be omitted, and only step S62 is performed.

A discussion is now given of the data format of a message, such as a search request, transmitted on a communication channel, and the data format handled by each service registry. Examples of only basic formats are given, though a variety of modifications may be considered.

As a simple example, if the service registry has service module information that contains an attribute name and an attribute, which are represented by certain character strings, the format shown in FIG. 17 is employed. On the other hand, if a plurality of attributes are provided for a single service module, a format having a plurality of entries should be used.

FIG. 17 shows a first example of the service module database possessed by the service registry. This database has three columns representing from the left to the right "module ID", "attribute name", and "attribute". The first line of the database represents the module ID "1", the attribute name "module type", and the attribute "broadcast manager". The second line indicates that the module ID is "2", the attribute name is "module type", and the attribute is "event manager". The third line shows that the module ID is "4", the attribute name is "module type", and the attribute is "network manager". The fourth line represents the module ID "11", the attribute name "module type", and the attribute "display".

The module ID defined in this specification is used for identifying the module within the node and is also employed as a message destination.

The service module database may be formatted, as illustrated in FIG. 18, if it is assumed that a service module has a plurality of attributes, for example, if the type and the name of the module are essential and a predetermined number of additional attributes may be provided.

FIG. 18 illustrates a second example of the service module database possessed by the service registry. The second database has six columns representing from the left to the right "module ID", "module type", "module name", "number of attributes", "attribute name 1", and "attribute 1". The first line of the database represents the module ID "1", the module type "1", the module name "broadcast manager", and the number of attributes "0". The second line indicates that the module ID is "2", the module type is "2", the module name is "event manager", and the number of attributes is "0". The third line shows that the module ID is "4", the module type is "3", the module name is "network messenger", and the number of attributes is "0". The fourth line denotes that the module ID is "11", the module type is "100", the module name is "D-001", the number of attributes is "1", the attribute name 1 is "size", and the attribute 1 is "21".

In the second database shown in FIG. 18, numeric values may be assigned to essential attributes inherent in the service module, thereby reducing the storage area in comparison with a database whose attributes are represented by character strings. For example, the numeric value "100" is assigned to an attribute of the service module to mean "display". Thus, information having an amount similar to the information shown in FIG. 17 can be stored with a smaller number of bytes.

In this example, the display "D-001" has an additional attribute, which is "size", while the other service modules do not have extra attributes. If "D-001" also has another attribute, such as "b/w" or "color", the number of attributes should be "2".

A further modification may be made to the database shown in FIG. 18. In regard to the attribute type of a certain service module, numeric values may be assigned to general attributes in advance, as shown in FIG. 19, thereby further reducing the storage area.

FIG. 19 illustrates a third example of the service module database possessed by the service registry. The third database has seven columns representing from the left to the right "module ID", "module type", "module name", "number of attributes", "attribute type", "attribute name", and "attribute". The first line of the database indicates that the module ID is "1", the module type is "1", the module name is "broadcast manager", and the number of attributes is "0". The second line shows that the module ID is "2", the module type is "2", the module name is "event manager", and the number of attributes is "0". The third line represents the module ID "4", the module type "3", the module name "network messenger", and the number of attributes "0". The fourth line indicates that the module ID is "11", the module type is "100", the module name is "D-001", the number of attributes is "3", the attribute type is "101", and the attribute is "21". The fifth line also concerning the module ID "11" represents the attribute type "102" and the attribute "color". The six line also concerning the module ID "11" represents the attribute type "0", the attribute name "sound", and the attribute "stereo".

In the above database, the attribute type "0" is an undefined type, which is required to be differentiated by the attribute name. The attribute types "101" and "102" represent the size and the color, respectively. The module type "100" means a display, as in the database shown in FIG. 18. Concerning a module having a plurality of additional attributes, the number of attributes is followed by variable-length attribute data.

In this database, all the attributes are indicated by character strings. However, a flag representing numeric data rather than a character string may be added to the attribute type, and then, numeric values, such as integers, floating point numbers, Boolean values, or enumerated types, may be used to represent the attributes.

Concerning a search request message received by the service registry, which should be performed to initiate the process steps of the flow chart of FIG. 12, the data format is determined by the degree of complexity of a search conducted on the database possessed by the service registry. For example, if a simple search is only required to be conducted on the database shown in FIG. 17, the search request message may be formatted, as illustrated in FIG. 20.

The search request message shown in FIG. 20 has two columns representing from the left to the right "search attribute name" and "search attribute". Under the columns, the search attribute name "module type" and the search attribute "display" are shown.

In this message, the format that expresses the character strings may vary in accordance with the processing system within the node. For example, PASCAL, which indicates the number of bytes at the header, or C or C++, which adds data indicating the end of a character string, may be employed.

The simple search request message shown in FIG. 20 is sufficient for the first example of the service module database illustrated in FIG. 17, since the attribute name and the attribute are represented by character strings. Other service module databases, such as those shown in FIGS. 18 and 19, may contain data other than character strings. Accordingly, it is necessary for the search request message to include the corresponding information.

The data format of a search request message containing information other than character strings is shown in FIG. 21. This format has three columns representing from the left to the right "search attribute type", "search attribute name", and "search attribute". Under the columns, the search attribute type "101" and the search attribute "21" are shown. There is no entry under the search attribute name. The "search attribute" in this database is the same as the "attribute" filled in the database shown in FIG. 19. The "search attribute name" is specified only when the search attribute type is "0". If, however, the search attribute is to include data (not shown) other than character strings, it is necessary to add the attribute type information indicating whether the search attribute is represented by a character string or numeric values. Although it is efficient to assign numeric values to the corresponding data in advance, character strings may be used instead to achieve expandability.

Further modifications may be made to the format of the search request message to achieve a more complicated search including logical operations, such as logical AND, OR, and NOT, and to restrict the search area only within a specific node or within nodes belonging to a specific group. An explanation of such modifications, however, is not given.

In the sequence of steps shown in FIG. 12, if the service registry, which has received a search request prior to step S21, has the database shown in FIG. 19, the search result created in step S22 may be indicated by the data format shown in FIG. 22.

The search result list shown in FIG. 22 has two columns representing from the left to the right "number of corresponding modules" and "corresponding module ID 1". Under the columns, the number of corresponding modules "1" and the corresponding module ID 1 "11" are shown. It should be noted that there may be a plurality of columns of the "corresponding module ID".

The list ID, such as "201" described below in connection with FIG. 24, representing the overall search result rather than the service module ID "11" that has matched the service request, is returned to the service module that has transmitted the search request in step S24.

The message that has been broadcast to the service registries of other nodes in step S21 may be formatted, as illustrated in FIG. 23. The message has three columns representing from the left to the right "sender ID", "search ID", and "search content". The "search content" is divided into "search attribute ID", "search attribute name", and "search attribute". Under the columns, the sender ID "XXXXXXXX", the search ID "1234", the search attribute ID "101", and search attribute "21" are indicated.

The message format shown in FIG. 23 is used when the service registry requests the broadcast manager to broadcast it. The broadcast manager further adds the header to the message before transmitting it to the network. As discussed above, the header includes the node ID of the transmitter and the broadcast ID.

Since the node ID and the module ID within the node are required when a search result is returned in response to the broadcast message, the sender ID, which is the module ID of the service registry within the node, is contained in the message shown in FIG. 23.

When a search result is returned from the above broadcast message, it is necessary to store which list is to be processed in accordance with the search ID. The data for storing the corresponding lists, which is referred to in step S41 of FIG. 14, may be formatted, as illustrated in FIG. 24.

The data shown in FIG. 24 includes three columns representing from the left to the right "search ID", "search result list ID", and "list unnecessary?" which indicates whether the list is no longer required. Under the columns, the search ID is "1234", the search result list ID is "201", and the list unnecessary flag is "0 (FALSE)".

A new search ID is entered when a search request is provided to be broadcast in step S21 of FIG. 12, and the search result ID created in step S22 is stored. A new search ID may be entered in any step of the flow chart of FIG. 12, since it is only essential that the database be updated prior to step S41 of FIG. 14.

If, however, high priority should be given to communications between service registries, it is important to complete the updating of the database in order to avoid erroneous operations by executing step S22 of FIG. 12 before broadcast is requested in step S21.

The processing executed by the service registry that has received the broadcast message shown in FIG. 23 is similar to that indicated by the flow chart of FIG. 13. The search result to be created within the service registry is also similar to that shown in FIG. 22. The search result returned to the service registry, which has transmitted the search request, in step S33 of FIG. 13 includes the search content rather than the list ID. Such a search result may be formatted, as illustrated in FIG. 25.

The message shown in FIG. 25 is not broadcast to unspecified nodes, but is delivered through one-to-one communications with the service registry that has transmitted the search request. For example, the message is transmitted to the service registry of the module ID "XXXXXXXX" of the broadcast node ID "AA".

The module IDs "B1" through "Bn" are meaningful only to the node "BB" to which the corresponding service modules belong but are meaningless to other nodes. It is, however, specified at the header of a message to be addressed to node "BB" that the message is to be delivered only to the service modules within the node "BB". Thus, the messenger of the node "BB" reliably delivers the message to the specified service modules. The same applies to the module ID "XXXXXXXX" which is specified as the sender when the service registry has broadcast the search request. It is not necessary for other nodes to recognize what "XXXXXXXX" means.

It is, however, necessary that all the nodes connected to the network handle the module ID in a similar manner, and thus, the bit length of the module ID is defined to be, for example, 64 bits.

In the event that the size of the module ID used in the network is different from that of the module ID used within the node, the service registry should manage a database in which the correlation between IDs reported to external sources and IDs used within its node is recorded. Then, the messenger refers to the above database when a message is delivered from an external node. Such a database merely stores a simple correlation between the two types of IDs and deviates from subject matter of the present invention. An explanation of the database is thus omitted.

Upon receiving the search result message shown in FIG. 25, the service registry of the node "AA" that has transmitted the search request adds, in step S42 of FIG. 14, n number of module IDs to the search result obtained by its node shown in FIG. 22. As a consequence, the search result is modified to the format illustrated in FIG. 26.

The message shown in FIG. 26 has n+2 columns representing from the left to the right "number of corresponding modules", "corresponding module ID 1", "corresponding module ID 2", . . . , "corresponding module ID n +1". Under the columns, the number of corresponding modules is "n+1", the corresponding module ID 1 "11", the corresponding module ID 2 is "B1'", . . . , the corresponding module ID n+1 is "Bn'".

In the search result shown in FIG. 26, the corresponding module IDs 2 through n+1 are not "B1" to "Bn" but "B1'" to "Bn'". This is because the module IDs are handled by each node in a unique manner, and thus, the original IDs "B1" to "Bn" at node "BB" mean different modules at the node "AA".

The simplest approach to convert from "Bi" to "Bi'" is to couple a node ID to a module ID used in the network, which is then used as an internal module ID to be communicated within its node. If the service module to be communicated belongs to its own node, the module ID of the attribute database managed by the service registry can be used as it is. Conversely, if the service module to be communicated belongs to another node, a proxy created by the node ID and the module ID of the attribute database of the service registry of the corresponding node is used. In this manner, the internal service modules and the external service modules are differentiated, as illustrated in FIG. 27.

The data shown in FIG. 27 has three columns representing from the left to the right "module ID at node AA", "node ID", and "module ID at node to which corresponding service module belongs". The first line indicates that the module ID at node AA is "11", the node ID is "0", and the module ID at the node to which the corresponding service module belongs is "11". The second line indicates that the module ID at node AA is "B1'", the node ID is "BB", and the module ID at the node to which the corresponding service module belongs is "B1". The final line shows that the module ID at node AA is "Bn'", the node ID is "BB", and the module ID at the node to which the corresponding service module belongs is "Bn". The data shows that Bi'=BB*(digit position)+Bi.

According to the above approach, however, the natural module IDs of the internal service modules are different from those of the external service modules. An extra memory area is also required for the internal service modules.

To overcome the above drawback, another approach to differentiate between the internal module IDs and the external module IDs is to manage an extra database, as well as the service module attribute information database of its own node and the search ID database. In this extra database, the natural module IDs of the internal service modules, the module IDs of the external modules, and the node ID of its own node are stored. For example, numbers 9999 or smaller may be used for the internal service modules, while numbers 10000 or greater may be used for external service modules.

The database representing the correlation between the internal service module IDs and the external service module IDs to implement the above approach is substantially similar to that shown in FIG. 27. In the former database, however, the entry of the service modules belonging to its own node is unnecessary, and module IDs having a natural length are used. Such a database is shown in FIG. 28.

The database shown in FIG. 28 includes three columns representing from the left to the right "module ID at node AA", "node ID to which corresponding service module belongs", and "module ID at node to which corresponding service module belongs". The first line of the database indicates that the module ID at node AA is "B1' (=10001), the node ID to which the corresponding service module belongs is "BB", and the module ID at the node to which the corresponding service module belongs is "B1". The final line indicates that the module ID at node AA is "Bn' (=10000+n)", the node ID to which the corresponding service module belongs is "BB", and the module ID at the node to which the corresponding service module belongs is "Bn".

In delivering a search result message, the messenger first checks whether the module ID of the destination is less than a prescribed value (for example, 10000), in which case, the message is directly delivered to the service module within its node. If the module ID of the destination is not less than the prescribed value, a query is made to the service registry as to the actual module ID and the node ID to which the service module belongs, and the message is then delivered to the corresponding service module in cooperation with the messenger of the corresponding node.

The parameter of the event representing that the search result has been updated contains only the search result ID. Accordingly, if the search result has been updated from the data shown in FIG. 22 to the data shown in FIG. 26, the event information is formatted as illustrated in FIG. 29.

The event information shown in FIG. 29 includes two columns representing from the left to the right "event type" and "parameter". As the "parameter", "search result ID" is entered. Under the columns, the event type "search result update" (SearchResultUpdate) and the search ID "201" are shown.

The parameter of the message sent from the node that has transmitted the search request in step S16 of FIG. 11 and received by the service registry prior to step S61 of FIG. 16 contains only the search result ID. The message is thus formatted as illustrated in FIG. 30.

The service registry, which has received the above message, changes the entry "list unnecessary?" shown in FIG. 24 from FALSE to TRUE and abandons the list having the ID number 201. If the database shown in FIG. 28 is used, the entries corresponding to the external module Ids contained in the list are deleted from the database.

According to the foregoing description, the service registries of the individual nodes are cooperatively operated, and simultaneously, the network can be transparent to service modules.

A description is now given of a more specific data format of the above-described messages transmitted through one-to-one communications or through broadcasting.

Figure 31:
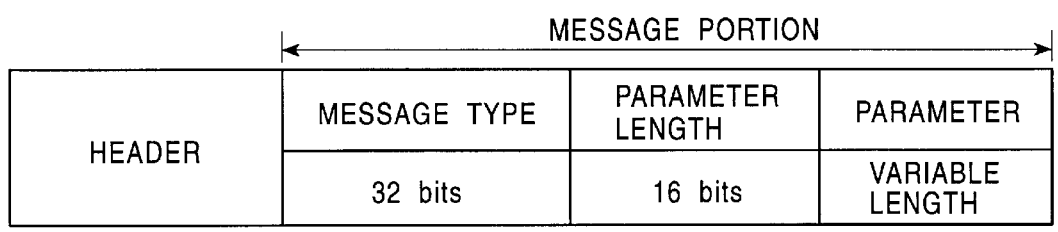
FIG. 31 illustrates a message transmitted from an object.

The message transmitted from an object service module to the event manager and the service registry is formed of, as illustrated in FIG. 31, a header for specifying the sender and the receiver, and a message portion. The message portion further includes a message type for specifying the content of the message, a parameter length, and a parameter of the message.

If the object service module reports an event, the event manager of the receiving node enters the event information in the message type and requests the messenger to transmit it in accordance with the event number and the event parameter.

The messenger manages a message to be transmitted and received specifically to one receiver among the service modules within the apparatus. Namely, the messenger transmits a message to the corresponding destination based on the ID set in each service module and the ID of the destination contained in the message header. During this operation, the messenger stores the message if the corresponding service module is being processed.

The messenger provides messages to the corresponding service modules by temporarily storing the messages in a memory or by forming a link between addresses of the messages and managing the link list.

According to the above technique, in transmitting messages among service modules, the messenger delivers messages sent from one sender to one receiver through one-to-one communications.

The event manager delivers an event message input through the messenger to the corresponding service module in the apparatus or utilizes the broadcast manager if the event message is to be delivered to the network.

The service list used in the delivery of the event message includes objects that require such event information, and is updated by a predetermined message sent via the messenger. The service list also serves as a service module list within the apparatus and is utilized by the broadcast manager when a service search is to be conducted.

Figure 32:
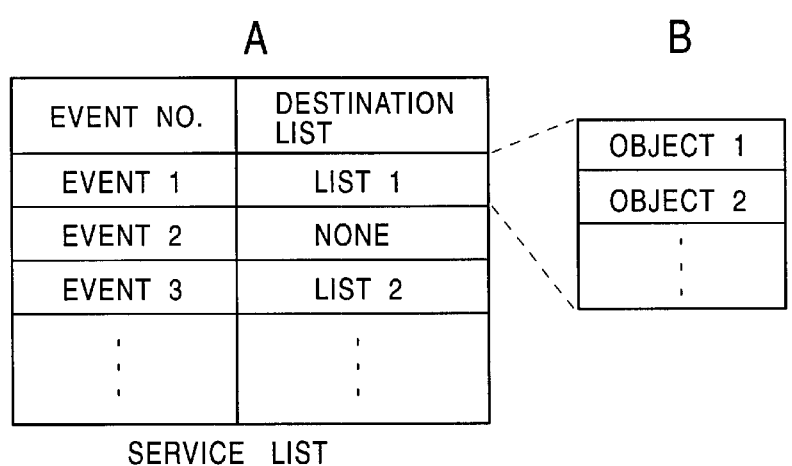
FIG. 32 illustrates a service list delivered to an event manager.

The service list is formed of, as illustrated in FIG. 32, the event number representing the type of event and the corresponding destinations. According to the service list, the event manager delivers an event information message received from the messenger. Namely, the event manager addresses the "event 1" to the "object 1" and "object 2" and, if a destination list is formed, creates the reported message. The event manager then transmits the two messages to the messenger.

In contrast, a message corresponding to the "event 2" is not delivered to any service module since it has no destination list. Simultaneously, the event manager Judges that the object has requested to broadcast this message. Accordingly, the event manager delivers the message in accordance with the service list and also requests the broadcast manager to broadcast it.

According to the foregoing procedure, a television receiver and a video cassette recorder are able to transmit a variety of event information obtained through one-to-one communications or one-to-many communications to the corresponding service modules. Within each apparatus, messages are delivered through one-to-one communications, and the event manager transmits the same message to a plurality of destinations.

In this manner, in delivering messages, the event manager specifies destinations in accordance with the service list and transmits a message to the messenger. The messenger then judges whether the destinations are within or without the apparatus, and if the message is addressed to unspecified destinations without the apparatus, the messenger sends the message to the broadcast manager.

Figure 33:
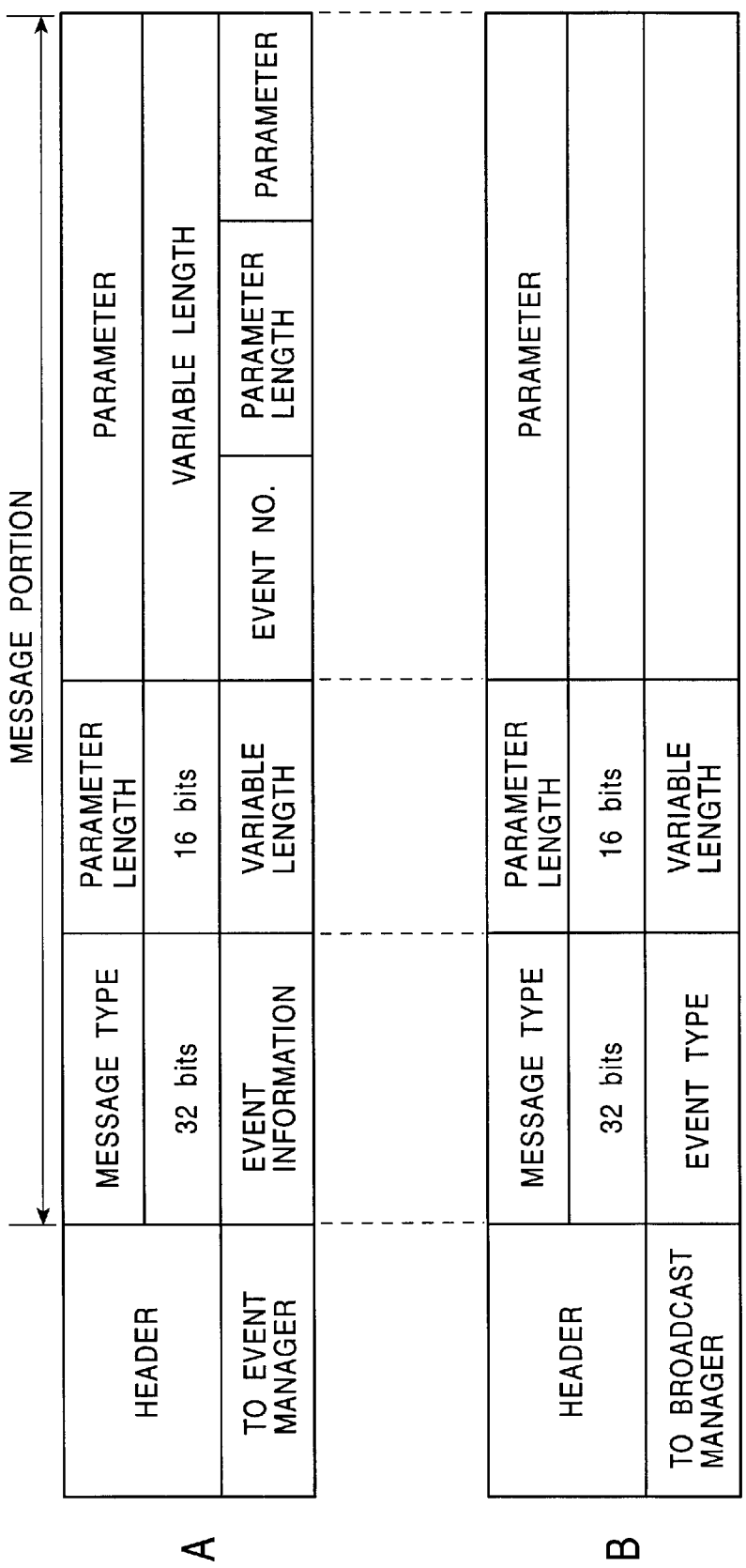
FIG. 33 illustrates a message sent from an event manager to a broadcast manager and a message sent from a broadcast manager to an event manager.

When the message is to be sent to the broadcast manager, the event manager transfers the content of the message indicated by A of FIG. 33 which has been reported by the messenger. In response to the transferred message, the broadcast manager transmits a message indicated by B of FIG. 33 to the event manager in the same format as the message received from the object.

In delivering the message, the event manager checks the message type of the received message. If the event manager determines from the message type that the received message is an observer message, it updates the service list in accordance with the content of the message. This enables, for example, a video cassette recorder, to report various types of events to an apparatus which is newly connected to the network.

FIG. 34 illustrates the data format used in reporting such an observer message. Only message portions are shown. The observer message is created by an object within or without the apparatus if necessary. For example, when the connection of an additional apparatus to the network is physically detected, the observer message is reported via the network messenger or the broadcast manager to the event manager of the newly connected apparatus or the previously connected apparatus.

Parameters of the messages normally transmitted and received between the service modules via the messenger are extended, as illustrated in FIG. 31 and A of FIG. 33. More specifically, a message for requesting an observer to be registered in the service list is formatted as illustrated in FIG. 34A. The observer type is set as the message type, and the event number and the observer to be informed are set as the parameters, each data having 32 bits. Conversely, in a message for canceling the registration of an observer, as shown in FIG. 34B, the registration-canceling type is set as the message type, and the event number and the observer to be canceled are set as the parameters, each data having 32 bits.

In accordance with the updating of the service list, the event manager transmits a confirmation message to the service module that has requested to be registered or canceled in a format similar to that of the observer registration or canceling message. The event manager also delivers a confirmation message in response to event information sent from the messenger or within the apparatus via the broadcast manager. Upon receiving event information, the event manager reports the generation of an event under the control of the service registry. Such event information is formed of, as illustrated in FIG. 34C, a message type representing the generation of an event, a parameter length indicating a variable parameter length, and parameter data.

Figure 35:
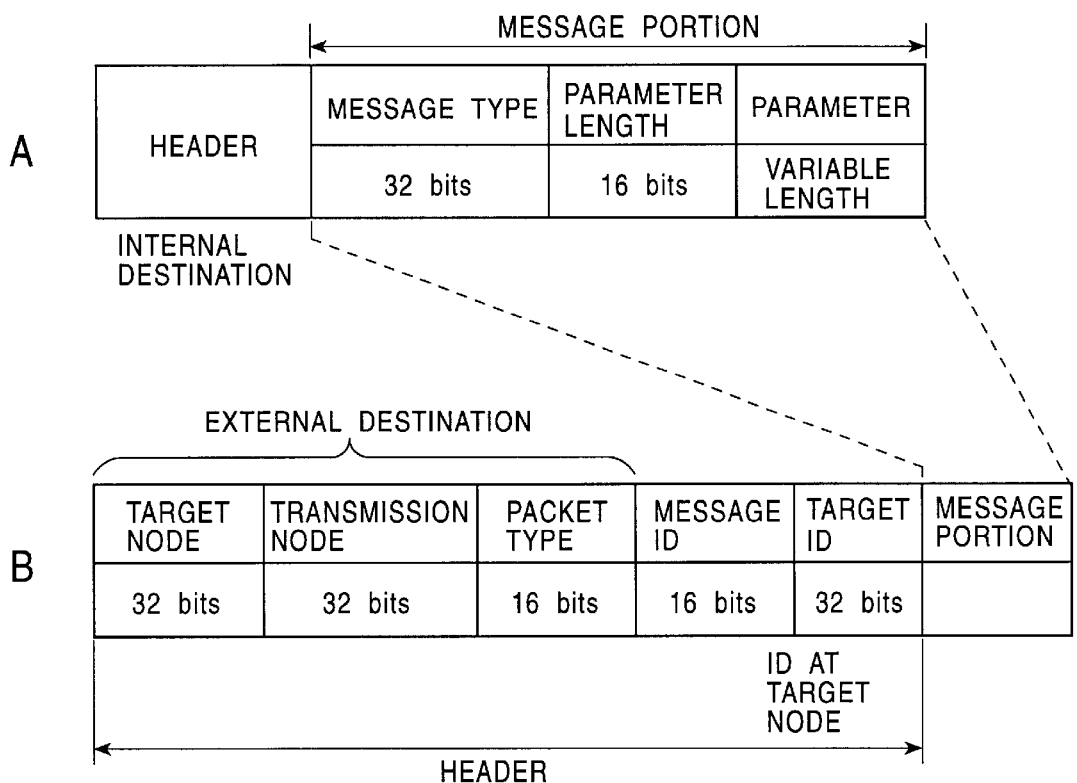
FIG. 35 illustrates a packet transmitted from a messenger to a transport module.

The messenger searches the stored ID list of external apparatuses and transmits a message to the network via the transport module in accordance with the searched ID. At this time, the messenger converts the message into a predetermined format to match the network and reports it to the transport module. Such a predetermined message format is a packet format, as illustrated in A and B of FIG. 35, which can be processed in common by the individual nodes connected to the network. Namely, the messenger forms such a packet in such a manner that the message type, the parameter length, and the parameter are set in a message portion and a header is added to the message portion.

If the target node, which is the receiver, has an Internet Protocol (IP) address, the header of the above packet is expressed by, for example, 32-bit data, though it varies in accordance with the type of network. By the type of packet, it is possible to differentiate between a packet to be transmitted to a specific object, a packet to be returned to a specific object in response to a demand from an external apparatus, and a packet of each apparatus connected to the network. If a packet is to be provided to the transport module and to be broadcast, it is generated by the broadcast manager rather than the network messenger.

A message ID for specifying the correlation between a transmitting packet and a responding packet is further added to the header. In the header, the target node ID, which can be identified within the node, is described by 32-bit data, thereby making it possible to specify the object within the apparatus to receive the packet.

The messenger further acquires packets to be input from the transport module and selects a packet to be addressed to its own node, and transmits the selected packet. In this manner, the messenger outputs messages sent from the objects within the apparatus to external apparatuses and inputs messages sent from the external apparatuses to the objects within its own node.

The messenger, as well as the event manager and the service registry, updates the stored ID list of the external apparatuses in accordance with the received message. This enables, for example, a video cassette recorder, to transmit various messages to a newly added apparatus through one-to-one communications.

The broadcast manager receives a message from the event manager and the service registry and broadcasts it to the network via the transport module. The broadcast manager further transmits messages related to the broadcast message via the transport module.

Conversely, the broadcast manager acquires messages broadcast to the network from other apparatuses, and also obtains messages related to the broadcast messages via the transport module and reports them to the event manager and the service registry.

A description is further given of the operating state of a CPU, which controls the entire electronic apparatus, such as a television receiver or a video cassette recorder.

In this example, the CPU has four power modes that change the power consumption, such as a fullspeed mode (Fullspeed Mode), a standby mode (Standby Mode), a suspend mode (Suspend Mode), and a hibernate mode (Hibernate Mode).

Figure 36:
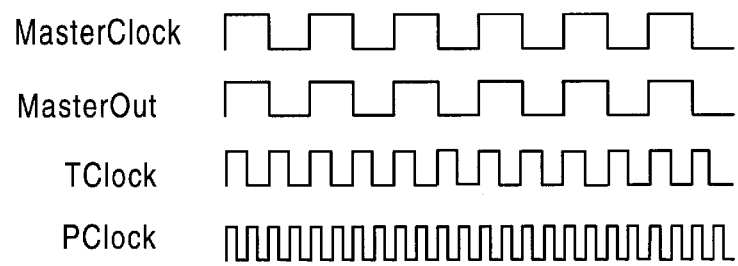
FIG. 36 is a timing chart of signals when a CPU is in the fullspeed mode.

The fullspeed mode is a normal operating mode in which all the internal clocks are operated at a predetermined frequency, as illustrated in FIG. 36. FIG. 36 illustrates sequentially from top to bottom the waveforms of the master clock (MasterClock), which is the clock signal supplied to the CPU, the master out (MasterOut), which is the signal of the individual elements of the CPU, the T clock (TClock) and the P clock (PClock). In the fullspeed mode, all the signals are operated.

Figure 37:
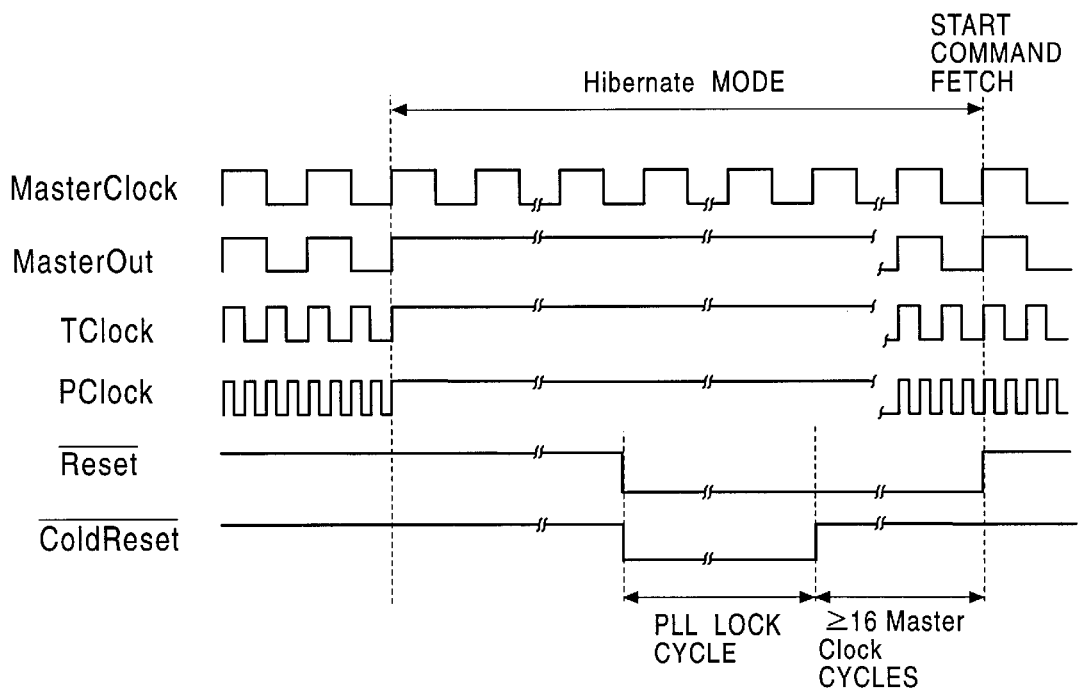
FIG. 37 is a timing chart of signals when a CPU is in the hibernate mode.

In the hibernate mode, all the clocks generated in the CPU are fixed at a high level and are deactivated, as shown in FIG. 37. Referring to FIG. 37, the clocks other than MasterClock, namely, MasterOut, TClock and PClock are fixed at a high level and deactivated. The reset signal (Reset) and the cold reset signal (ColdReset) represent a transition sequence from the hibernate mode to the fullspeed mode.

In the standby mode, all the internal clocks other than a timer/interrupt clock are fixed and deactivated, though it is not shown. The P clock shown in FIG. 36 is fixed at a high level.

In the suspend mode, all the internal clocks other than the timer/interrupt clock are fixed at a high level and deactivated. The T clock and the P clock shown in FIG. 36 are fixed at a high level.

As discussed above, the above-described CPU has modes in which predetermined internal clocks are turned off, thereby reducing power consumption. Namely, the number of clocks to be turned off is increased in the order of the fullspeed mode, the standby mode, the suspend mode, and the hibernate mode, thereby achieving a reduction in power consumption.

Therefore, in an electronic apparatus, such as a television receiver or a video cassette recorder, unless it is required that the CPU is operated in a normal manner, the CPU enters a power mode other than the fullspeed mode and is in a standby position or turned off. Power consumption is thus reduced.

A recording medium is now described below.

The recording medium stores a program that implements a process including an attribute information acquiring step of acquiring attribute information of a single or a plurality of objects and an attribute information management step of switching off the power supply after transmitting the attribute information acquired in the above attribute information acquiring step to another electronic apparatus and delegating it to respond to queries concerning the attribute information provided from an external source.

Alternatively, the recording medium stores a program that implements a process including an attribute information acquiring step of acquiring attribute information of a single or a plurality of objects and also acquiring, upon being delegated by another electronic apparatus, attribute information of the electronic apparatus. The process also includes an attribute information management step of responding to queries, upon being delegated by the above apparatus, concerning the attribute information of the above apparatus acquired in the above attribute information acquiring step.

The aforementioned recording medium may be provided in the form of a compact disc-read only memory (CD-ROM) or a magneto-optical (MO) disk in which the above-described program is recorded. The program is supplied via a medium, such as a communication line.

As discussed above, the electronic apparatus, the power supply control method, or the recording medium of the present invention is applicable to a video unit for use in an AV system. The electronic apparatus of the invention is provided with an information broadcast manager that broadcasts messages to a network and an event manager that delivers messages within the apparatus. Accordingly, as viewed from the objects within the apparatus, messages can be transmitted and received regardless of whether the messages are to be transmitted or received within or without the apparatus or regardless of whether to transmit to or receive from specified apparatuses or unspecified apparatuses. This enables the network to spend more time to transmit information signals.

To respond to a message requesting to switch on the power supply from an external source, a normal messenger may be operated. Alternatively, communication hardware, which interprets the above message, may be used to switch on the main unit including the CPU without requiring to run a software program every time this type of message is transmitted.

In an AV network in which each node manages a list of service modules within the node and has a service registry that responds to queries which have been broadcast to unspecified machines, and normal object service modules search a required service module by using the service registry, the following power supply control method is achieved. In this method, even if the power supply of a machine whose service modules are not in use is switched off, the service modules of the other machines are able to search for a required service module. The service registry of the machine which is to be switched off reports the content of the list to the service registry of another machine and delegates it to respond to a search request. The delegated service registry requests the service registry of the machine that has requested a search delegation when it becomes necessary to utilize a service module contained in the list.

As is seen from the foregoing description, the electronic apparatus, the power supply control method, and the recording medium according to the present invention offer the following advantages.

By delegating the service registry of another node to respond to a search request, it is possible to deactivate the CPU and to eliminate the necessity of processing broadcast messages, thereby achieving a reduction in power consumption.

When machines are separately operated in a network, i.e., distributed processing is executed, the individual machines each having a service module is separately conducting a search. It is thus easy to check whether the module ID is valid by the individual machines rather than a case, for example, in which a computer centrally controls all the IDs. Even if a machine has delegated another machine to conduct a search in order to switch off the power, the validity of a module ID can be checked only during a short period from switching off the power supply to switching on the power supply again by querying the service registry of the delegated machine. On the whole, a check of the validity of a module ID can be simplified.

What is claimed is:

1. An electronic apparatus for controlling at least one object, said apparatus comprising:

attribute information storage means for storing attribute information of said at least one object; and attribute information management means for managing said attribute information storage means and for switching off a power supply after transmitting the attribute information stored in said attribute information storage means to attribute information management means provided for an external electronic apparatus and delegating said external electronic apparatus to respond to queries provided from an external source concerning the attribute information stored in said attribute information storage means.

2. An electronic apparatus according to claim 1, wherein the power supply is switched off so that a central processing unit provided for said electronic apparatus is deactivated and said electronic apparatus enters a standby position in which power consumption is reduced.

3. Apparatus for controlling at least one object of an electronic apparatus, said apparatus comprising:

attribute information storage means for storing attribute information of said at least one object of said electronic apparatus and for storing, upon being delegated by a first external electronic apparatus, attribute information of at least one object of said first external electronic apparatus; and attribute information management means for managing said attribute information storage means and for responding to queries provided from an external source concerning the attribute information of said at least one object of said electronic apparatus stored in said attribute information storage means and to queries provided from the external source concerning the attribute information of said at least one object of said first external electronic apparatus.

4. Apparatus according to claim 3, wherein said attribute information management means switches off a power supply after transmitting the attribute information of said at least one object of said electronic apparatus stored in said attribute information storage means and transmitting, upon being delegated by said first external electronic apparatus, the attribute information of said at least one object of said first external electronic apparatus stored in said attribute information storage means to a second external electronic apparatus and delegating said second external electronic apparatus to respond to queries from the external source.

5. Apparatus according to claim 4, wherein the power supply is switched off so that a central processing unit provided for said electronic apparatus is deactivated and said electronic apparatus enters in a standby position in which power consumption is reduced.

6. A power supply control method for controlling a power supply of at least one object, said method comprising:

an attribute information acquiring step of acquiring attribute information of said at least one object; and an attribute information management step of managing the attribute information acquired in said attribute information acquiring step and switching off the power supply after transmitting the attribute information to an external electronic apparatus and delegating said external electronic apparatus to respond to queries concerning the attribute information provided from an external source.

7. A power supply control method for controlling a power supply of at least one object of an electronic apparatus, said method comprising:

an attribute information acquiring step of acquiring attribute information of said at least one object of said electronic apparatus and acquiring, upon being delegated by a first external electronic apparatus, attribute information of at least one object of said first external electronic apparatus; and an attribute information management step of responding to queries concerning the attribute information of said at least one object of said electronic apparatus acquired in said attribute information acquiring step and to queries provided from an external source concerning the attribute information of said at least one object of said first external electronic apparatus.

8. A power supply control method according to claim 7, wherein said attribute information management step switches off the power supply after transmitting the attribute information of said at least one object of said electronic apparatus acquired in said attribute information acquiring step and after transmitting, upon being delegated by said first external electronic apparatus, the attribute information of said at least one object of said first external electronic apparatus to a second external electronic apparatus and delegating said second external electronic apparatus to respond to queries concerning the attribute information provided from the external source.

9. A recording medium in which a program implementing a process is recorded, said process comprising:

an attribute information acquiring step of acquiring attribute information of at least one object; and an attribute information management step of switching off a power supply after transmitting the attribute information acquired in said attribute information acquiring step to an external electronic apparatus and delegating said external electronic apparatus to respond to queries concerning the attribute information provided from an external source.

10. A recording medium in which a program implementing a process is recorded, said process comprising:

an attribute information acquiring step of acquiring attribute information of at least one object of an electronic apparatus and acquiring, upon being delegated by an external electronic apparatus, attribute information of at least one object of said external electronic apparatus; and an attribute information management step of responding to queries concerning the attribute information of said at least one object of said electronic apparatus acquired in said attribute information acquiring step and to queries concerning the attribute information of said at least one object of said external electronic apparatus provided from an external source.

* * * * *